US008358827B2

(12) United States Patent
Faulkner et al.

(10) Patent No.: US 8,358,827 B2
(45) Date of Patent: Jan. 22, 2013

(54) OPTICAL WAVEFORM GENERATION AND USE BASED ON PRINT CHARACTERISTICS FOR MICR DATA OF PAPER DOCUMENTS

(75) Inventors: Bill Faulkner, Waterloo (CA); Dmitri Eidenzon, Waterloo (CA)

(73) Assignee: RDM Corporation, Waterloo (CA)

( * ) Notice: Subject to any disclaimer, the term of this patent is extended or adjusted under 35 U.S.C. 154(b) by 520 days.

(21) Appl. No.: 12/659,023

(22) Filed: Feb. 23, 2010

(65) Prior Publication Data

US 2011/0206268 A1 Aug. 25, 2011

(51) Int. Cl.
*G06K 9/00* (2006.01)
(52) U.S. Cl. .................. 382/137; 382/181; 358/3.27
(58) Field of Classification Search ................. None
See application file for complete search history.

(56) References Cited

U.S. PATENT DOCUMENTS

| | | | | |
|---|---|---|---|---|
| 3,361,872 A * | 1/1968 | Sweeney | ......................... | 348/26 |
| 5,410,617 A * | 4/1995 | Kidd et al. | .................... | 382/169 |
| 6,577,762 B1 * | 6/2003 | Seeger et al. | ................. | 382/173 |
| 7,813,554 B2 * | 10/2010 | Wang et al. | .................... | 382/199 |
| 2007/0160295 A1 * | 7/2007 | Wang et al. | .................... | 382/199 |

\* cited by examiner

*Primary Examiner* — Manav Seth
(74) *Attorney, Agent, or Firm* — Grant Tisdall; Gowling Lafleur Henderson LLP

(57) ABSTRACT

A method and system for determining an optical waveform based on a plurality of print features of a selected marking of a document. The method and system comprise obtaining optical image data representing the print features of the selected marking. The optical image data is corrected for at least one of print contrast or reflectance of the print features in the optical image data using respective print contrast thresholds or reflectance thresholds to produce a converted pixel map of the selected marking, the pixel map containing an ordered sequence of values. Also included is a generation module to transform the print features represented in the converted pixel map to a plurality of corresponding waveform features to produce the optical waveform of the selected marking, the corresponding waveform features including a plurality of spaced apart peaks representing respective optical signal levels of the print features.

20 Claims, 16 Drawing Sheets

OPTICAL WAVEFORM GENERATION AND USE BASED ON PRINT CHARACTERISTICS FOR MICR DATA OF PAPER DOCUMENTS

FIELD OF INVENTION

The present invention relates to image processing of paper documents.

BACKGROUND

The current paper document-processing environment is dependent upon paper processing, which can be inefficient. What is needed is an efficient electronic paper document design process that confirms a paper document design that will be compatible with current electronic capture, storage, and processing system, which are used to alleviate or otherwise mitigate the dependence upon paper form of items such as personal and business checks, for example. Since a vast majority of checks are transported physically via air from one bank to another, and planes can be grounded for a variety of reasons, substantial costs can be incurred by banks due to check processing being delayed. The current system relies upon the physical movement of original paper checks from the bank where the checks are deposited to the bank that pays them, which can be inefficient and costly.

Under current law, a bank may send the original paper check for payment unless it has an electronic payment agreement with the paying bank. Under Check 21 legislation in the United States, by authorizing the use of a new negotiable instrument called a "substitute check" (aka image replacement document), electronic check processing is enabled without mandating that any bank change its current check collection practices. The substitute check is a paper reproduction of an original check that contains an image of the front and back of the original check, which is suitable for automated processing in the same manner as the original check, as long as the check image meets other technical requirements, such as having mandated image quality, otherwise referred to as image readiness that includes acceptable print contrast between the check background and any critical data (e.g. signatures, printed amounts, etc.) placed over the background.

As a result of Check 21, banks that wish to scan the original paper check to create a substitute check require it to satisfy print contrast signal (PCS) standards with respect to the check background. Print contrast acceptability is the design attribute of a check that ensures optimum recognition of amounts, legibility of handwriting, and reasonably low file size that are positioned overtop of any background design images on the surface of the check. Current testing of print contrast is done by calculating a subjectively selected portion of the background of the printed document (e.g. check) using a static background image sample as representative for the print contrast of the entire document. For example, excessive background clutter resulting from the background image(s) causes interference with the legibility of handwritten data (i.e. critical data) and low background reflectance of the background image(s) causes handwritten data to drop out due to insufficient contrast.

Unfortunately, current testing for print quality only uses a statically selected background sample to test print contrast signal compliance of the check document design, which can be subjective as each tester can get a different print contrast signal of a check depending upon the static background image sample that is selected by the tester. This manual testing process is inefficient in cost and time due to the check designs that may pass some PCS testing only to fail PCS standards when processed by other check image processing equipment.

Further, it is known that a magnetic reader can identify each magnetized character and symbol of the MICR line using logical analysis algorithms of the magnetic wave patterns that the characters produce. However, while MICR characters may be read magnetically and pass magnetic testing in comparison to magnetic waveform templates as is know in the art, it is recognised that optical characteristics of the same MICR characters (in particular in the presence of competing optical print information such as background markings and improper reflectance of the surface of the document, for example) can cause the same MICR characters to be rejected due to optical defects (e.g. voids in the lines/strokes of the characters, incorrect visual inter or intra spacing of character lines/strokes, and/or incorrect heights/widths of the character lines/strokes) of the printed characters 14. Further, for non-MICR markings on the document, there is no magnetic waveform to rely upon to objectively test the optical character of the markings IM.

Accordingly, there exists a substantial disadvantage with correct document imaging techniques and corresponding optical quality testing techniques for OCR read visual features of the documents as print contrast signal compliance of the check document design can be subjective as each tester can get a different print contrast signal of a check depending upon the static background image sample that is selected by the tester. This manual testing process is inefficient in cost and time due to the check designs that may pass some PCS testing only to fail PCS standards when processed by other check image processing equipment. MICR testing via magnetic methods does not have the added potential for error generation of optical testing due to the print contrast and/or reflectance issues inherent in the OCR reading of the print characters, for example to counteract the effects of background images on the document surface, as the document print surrounding the MICR characters should not contain magnetic ink.

SUMMARY

There is a need for a method and a system for paper document testing that overcomes or otherwise mitigates a disadvantage of the prior art.

It is recognised that optical characteristics of the MICR characters (in particular in the presence of competing optical print information such as background markings and improper reflectance of the surface of the document, for example) can cause the MICR characters to be rejected due to optical defects (e.g. voids in the lines/strokes of the characters, incorrect visual inter or intra spacing of character lines/strokes, and/or incorrect heights/widths of the character lines/strokes) of the printed characters 14. Further, for non-MICR markings on the document, there is no magnetic waveform to rely upon to objectively test the optical character of the markings IM. Accordingly, there exists a substantial disadvantage with correct document imaging techniques and corresponding optical quality testing techniques for OCR read visual features of the documents as print contrast signal compliance of the check document design can be subjective as each tester can get a different print contrast signal of a check depending upon the static background image sample that is selected by the tester. This manual testing process is inefficient in cost and time due to the check designs that may pass some PCS testing only to fail PCS standards when processed by other check image processing equipment. MICR testing via magnetic methods does not have the added potential for error generation of optical testing due to the print contrast and/or reflectance issues inherent in the OCR reading of the print characters, for example to counteract the effects of background images on the document surface, as the document print surrounding the MICR characters should not contain magnetic ink.

Contrary to current document testing methods and systems there is a method and system for determining an optical waveform based on a plurality of print features of a selected marking of a document. The method and system comprise obtaining optical image data representing the print features of the selected marking. The optical image data is corrected for at least one of print contrast or reflectance of the print features in the optical image data using respective print contrast thresholds or reflectance thresholds to produce a converted pixel map of the selected marking, the pixel map containing an ordered sequence of values. Also included is a generation module to transform the print features represented in the converted pixel map to a plurality of corresponding waveform features to produce the optical waveform of the selected marking, the corresponding waveform features including a plurality of spaced apart peaks representing respective optical signal levels of the print features.

A first aspect provided is a method for determining an optical waveform based on a plurality of print features of a selected marking of a document, the method comprising the steps of: obtaining optical image data representing the print features of the selected marking; correcting at least one of print contrast or reflectance of the print features in the optical image data using respective print contrast thresholds or reflectance thresholds to produce a converted pixel map of the selected marking, the pixel map containing an ordered sequence of values; and transforming the print features represented in the converted pixel map to a plurality of corresponding waveform features to produce the optical waveform of the selected marking, the corresponding waveform features including a plurality of spaced apart peaks representing respective optical signal levels of the print features.

A second aspect provided is a system for determining an optical waveform based on a plurality of print features of a selected marking of a document, the system comprising: an optical reader device to obtain optical image data representing the print features of the selected marking; a conversion module to correct at least one of print contrast or reflectance of the print features in the optical image data using respective print contrast thresholds or reflectance thresholds to produce a converted pixel map of the selected marking, the pixel map containing an ordered sequence of values; and a generation module to transform the print features represented in the converted pixel map to a plurality of corresponding waveform features to produce the optical waveform of the selected marking, the corresponding waveform features including a plurality of spaced apart peaks representing respective optical signal levels of the print features.

A further aspect provided is an optical reader device configured to generate an optical waveform based on a plurality of print features of a selected marking of a document, the device comprising: an optical reader head to obtain optical image data representing the print features of the selected marking; a conversion module to correct at least one of print contrast or reflectance of the print features in the optical image data using respective print contrast thresholds or reflectance thresholds to produce a converted pixel map of the selected marking, the pixel map containing an ordered sequence of values; and a generation module to transform the print features represented in the converted pixel map to a plurality of corresponding waveform features to produce the optical waveform of the selected marking, the corresponding waveform features including a plurality of spaced apart peaks representing respective optical signal levels of the print features.

BRIEF DESCRIPTION OF THE DRAWINGS

These and other features will become more apparent in the following detailed description in which reference is made to the appended drawings by way of example only, wherein.

DESCRIPTION

Paper Documents 12

Figure 1:
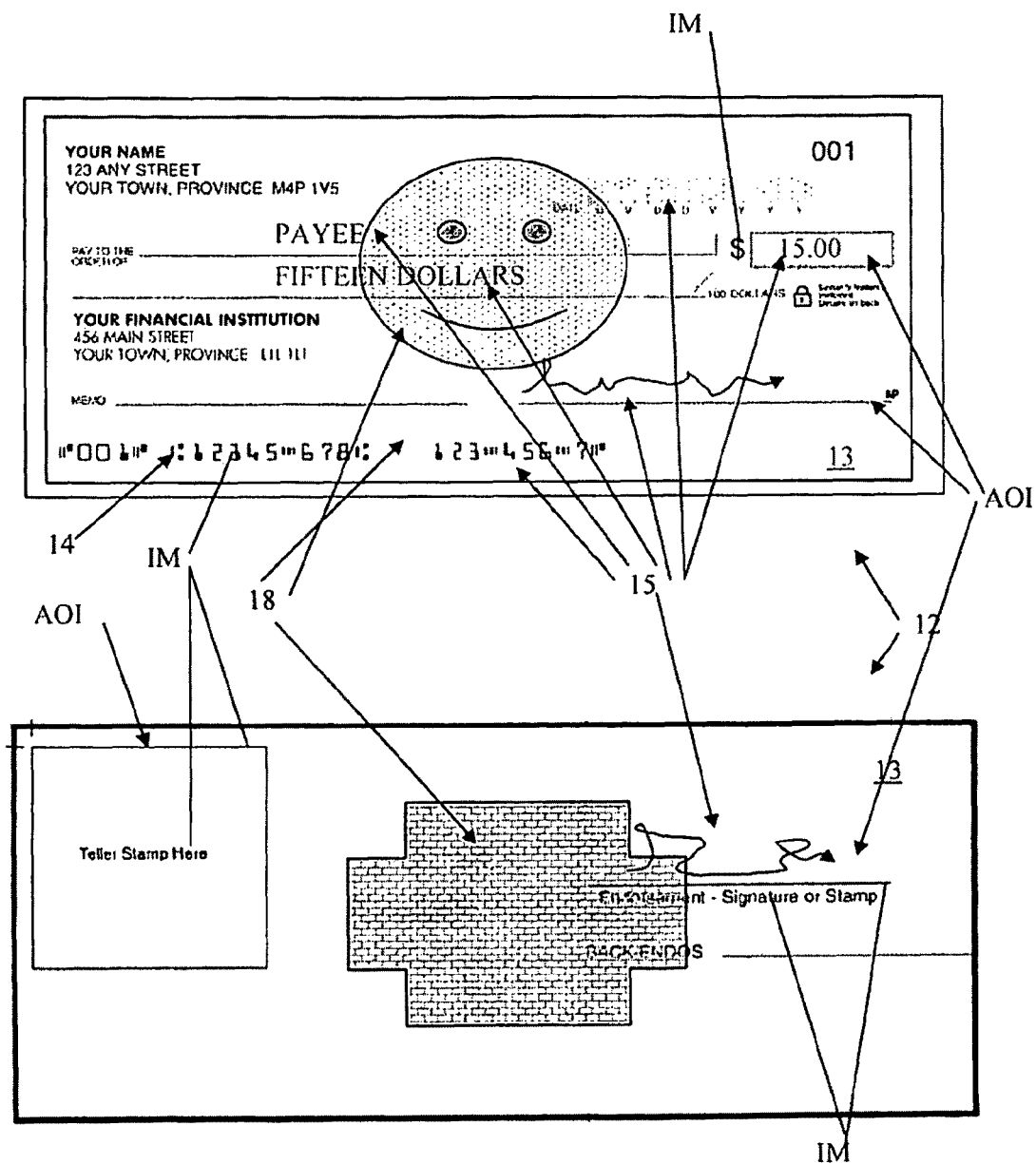
FIG. 1 is an example document.
Figure 2:
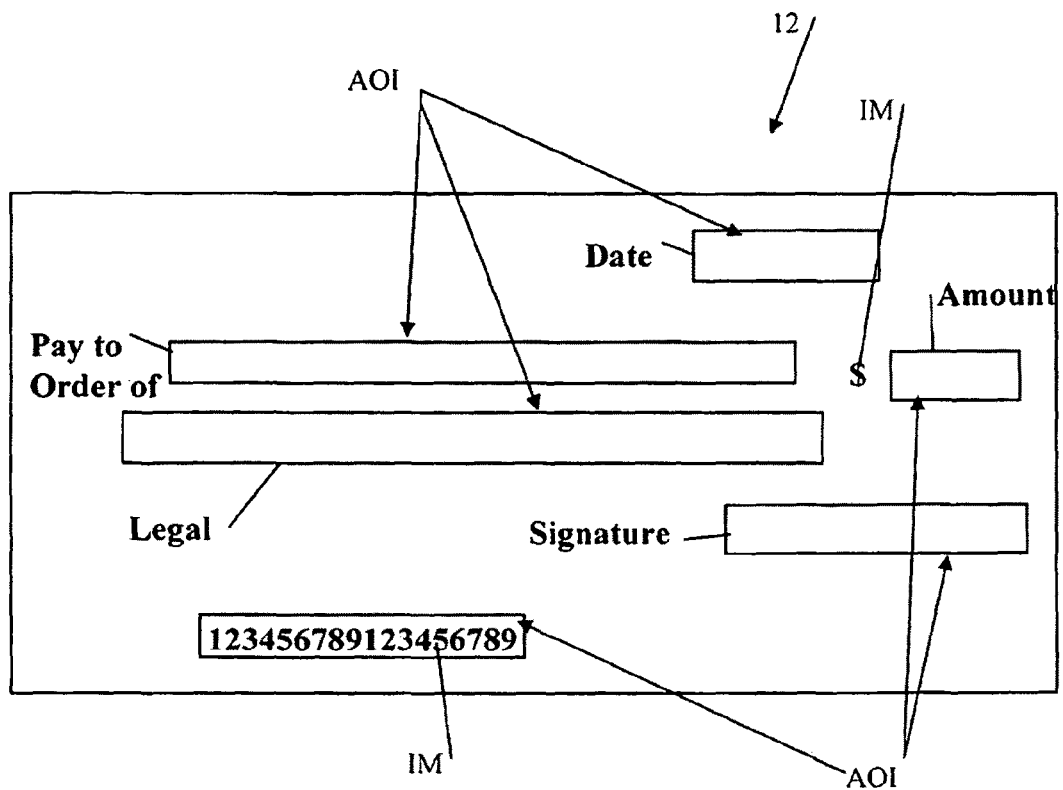
FIG. 2 shows example areas of interest of the document of FIG. 1.
Figure 3:
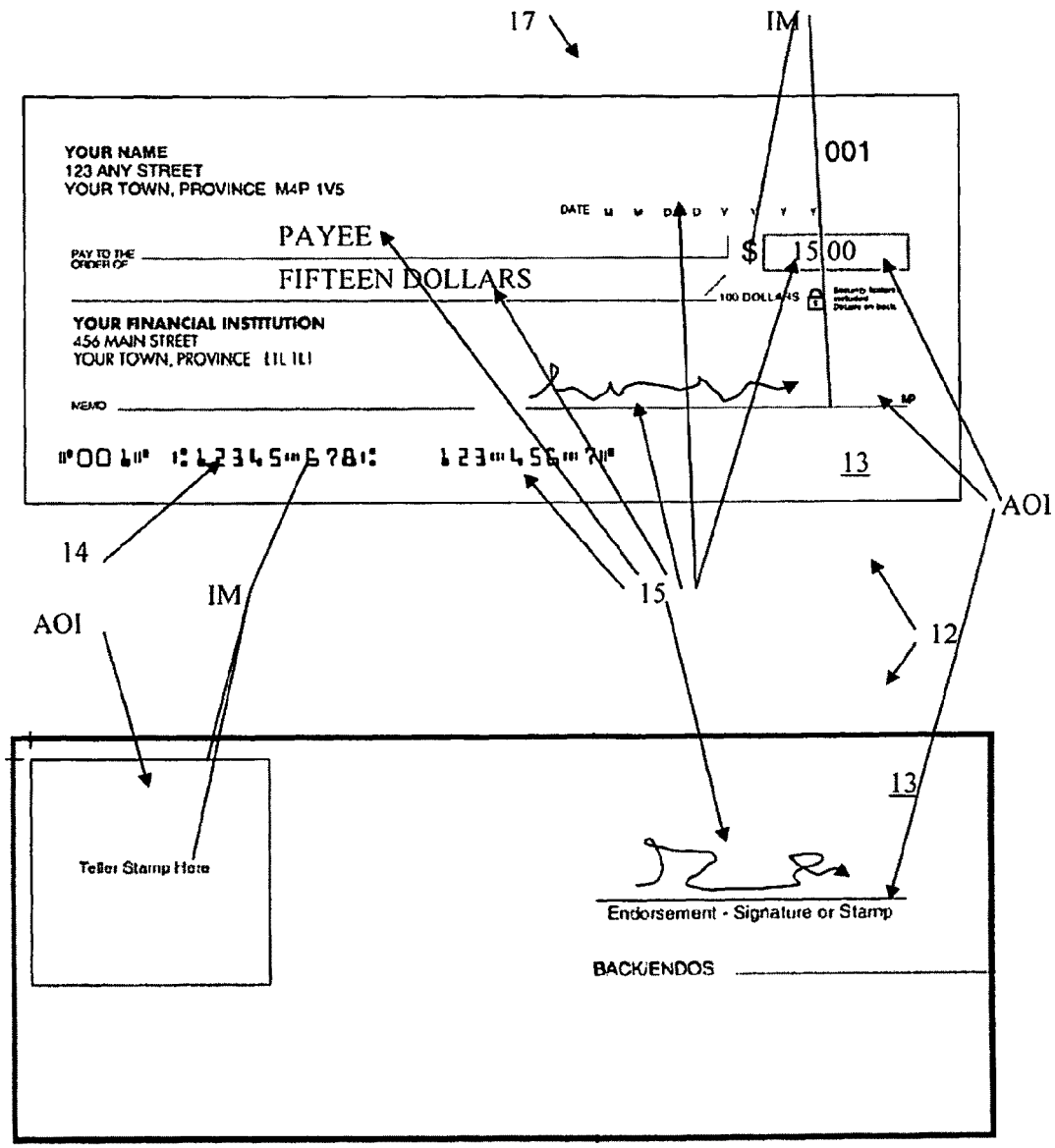
FIG. 3 shows a scanned image of the document of FIG. 1 with background features removed.
Figure 4:
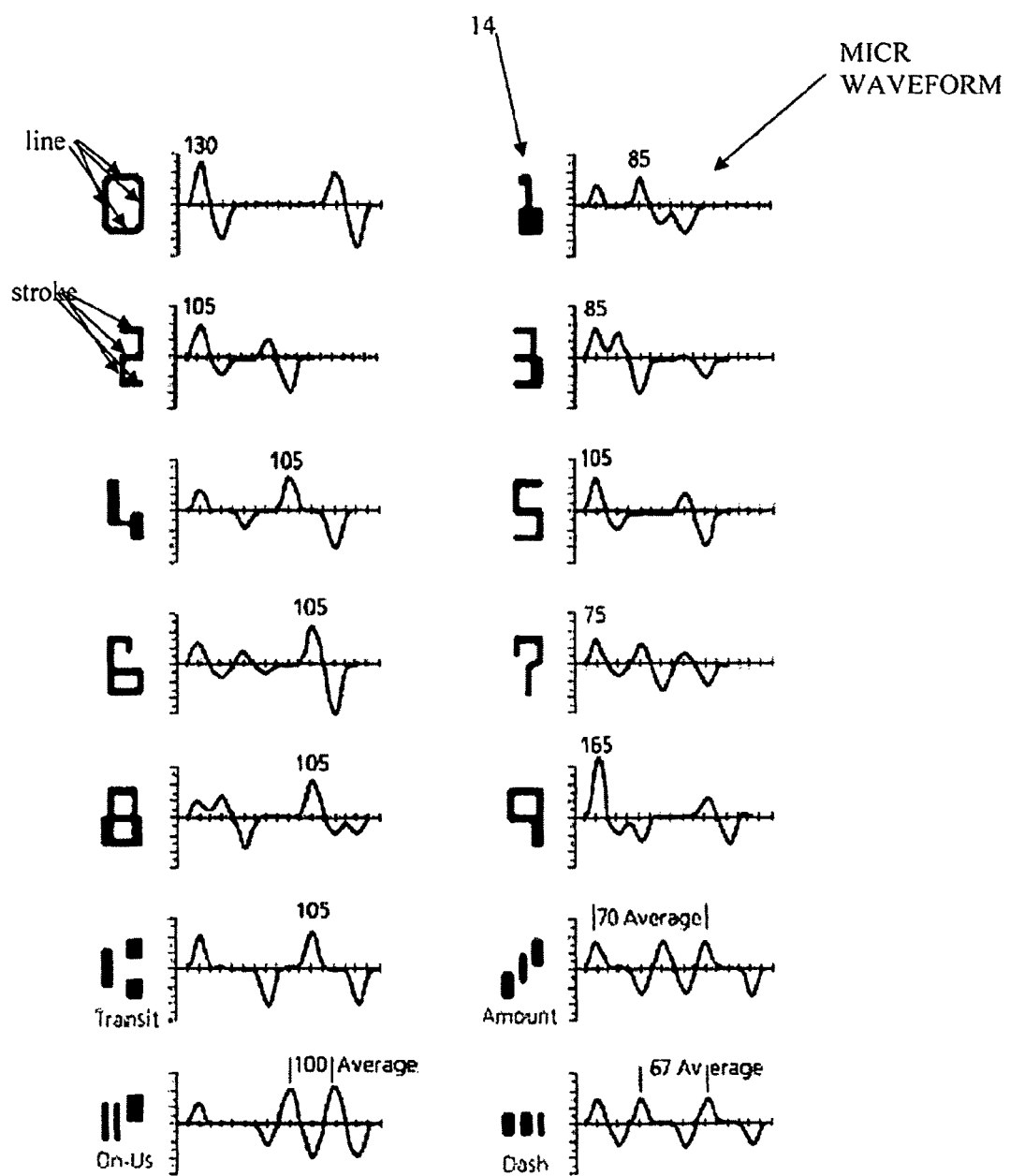
FIG. 4 shows markings as MICR characters of the document of FIG. 1.

Referring to FIG. 1, shown are two example paper documents (e.g. checks) 12 having a plurality of areas of interest (AOIs), see FIG. 2, which are considered as the areas on a document surface 13 that contain critical data 15 (e.g. signature) as well as interest markings IM that should be discernable in a recorded digital image 17 (as performed using various OCR techniques) of the document surface 13 (see FIG. 3). In the case of where the document 12 is a check, the areas of interest. AOI are such as but not limited to: Date; Payee; Numerical Amount; Legal Amount (Amount Spelled out); Signature Lines; and the MICR numbering line Area. In general, it is noted that the areas of interest AOI and the interest markings IM can also contain background images 18 (e.g. pictures/images, designs, fill schemes, personal or business logo; font style; color; size and location background features and check fields—e.g. AOIs, etc.). These background images 18 are designed such that they provide a desirable graphical design appeal of document surface 13 while at the same time do not occlude or otherwise interfere with the quality of the digital image recording of the critical data 15 located in the areas of interest AOI as well as occlude or otherwise interfere with the image quality of the interest markings IM. It is recognised that the image recording process of the document surface 13 provides for scanning and binary conversion (i.e. into a plurality of pixel values) of the critical data 15 (e.g. handwriting) from the areas of interest AOI and the interest markings IM. It is also recognised that the background images 18 should not occlude the interest markings IM on the surface 13 of the document 12, such as but not limited to the MICR characters 14, specified text (e.g. "Teller Stamp Here Box"), the dollar sign, etc. In any event, it is recognised that the background images 18 should drop out from the AOIs (so that any critical data 15 resident in the AOIs will not be occluded) and the background data 18 should also drop out from the surface 13 areas adjacent to the interest markings IM that the interest markings IM are legible in the image 17 of the document 12.

It is recognised that the documents 12 can be manufactured using a variety of different stock materials 16 such as but not limited to different versions of paper, etc. It is also recognised that the documents 12 can be embodied as any document that has a requirement for image quality of selected areas (e.g. AOIs) of the document surface 13, such that the selected area(s) (e.g. AOI(s), IM(s)) of the scanned image 17 (see FIG. 3) of the document 12 satisfy specified PCS threshold(s) 20 (see FIG. 5). Examples of the documents 12 are such as but not limited to: checks; coupons; forms; and other documents 12 suitable for having the scanned image 17 (e.g. a grey scale image) recorded of the document surface 13 (e.g. front side and/or backside of the document 12).

Referring to FIG. 2, shown are example areas of interest AOI and interest markings IM for a check embodiment of the document 12, as discussed above. It is also recognised that the areas of interest AOI for a form and/or coupon can be areas such as but not limited to: signature region, identification number/information; visible security feature positioned on document surface 13; logo or other visible icon(s); etc. Referring to FIG. 3, shown is the scanned digital image 17 of the document 12 of FIG. 1, such that the background images 18 (see FIG. 1) have not occluded the critical data 15 resident in the areas of interest AOI, nor the IMs.

Figure 6:
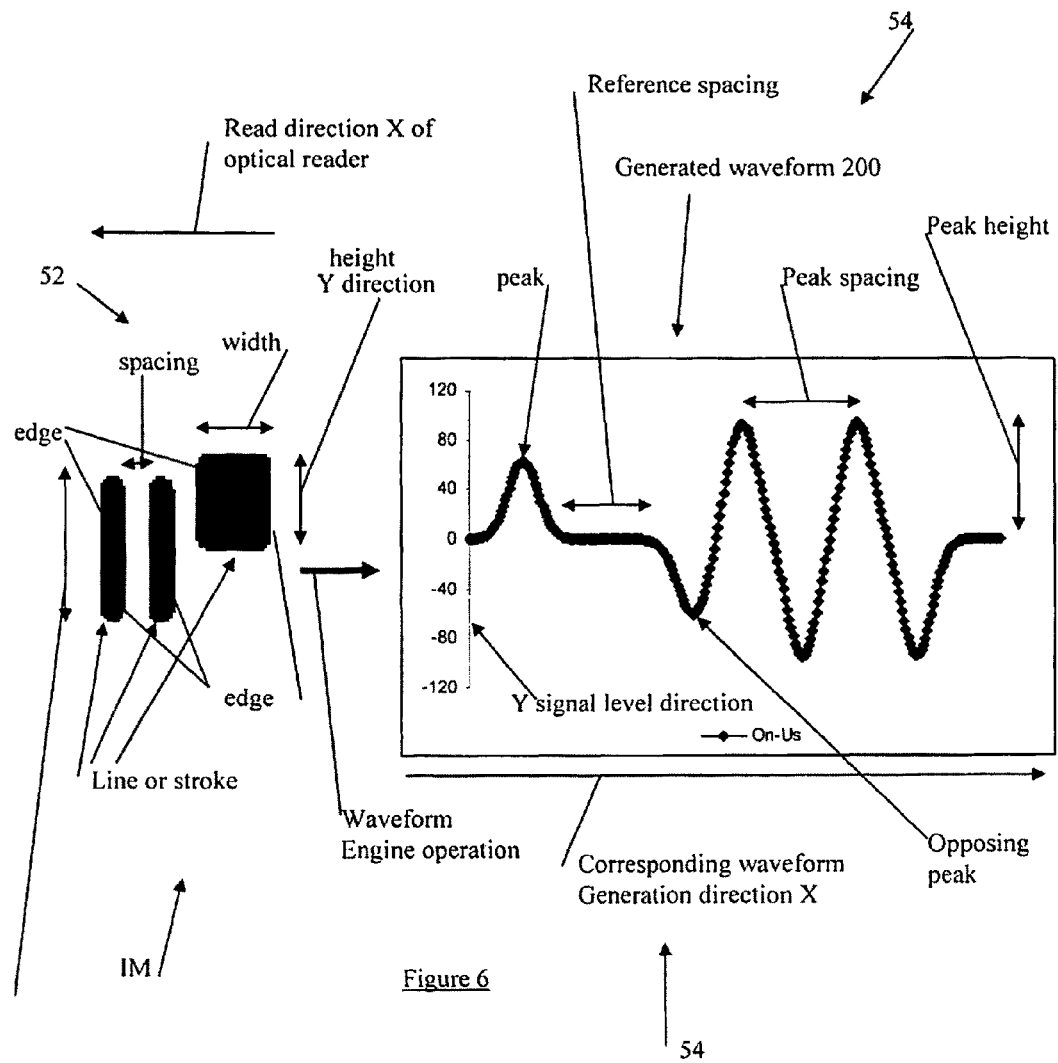
FIG. 6 shows an example generated optical waveform for print features of a selected marking of the document of FIG. 1.

It is recognised that the interest markings IM, for example MICR characters 14, have associated dimensional thresholds 20 that are acceptable according to an optical print standard for the IM dimensions (e.g. marking height, marking width, marking contrast as a measure of image intensity of the marking, spacing between lines/strokes of a particular marking, spacing between lines/strokes of adjacent markings, etc.—see FIG. 6), such that the identified dimensions (e.g. via OCR) of the markings IM must be above or below their corresponding respective threshold value 20 of the optical print standard.

Document 12 Types

Turnaround documents 12 refer to any type of volume transaction, whether negotiable or not, that requires data capture. Familiar examples of turnaround documents 12 are: credit card invoices; insurance payment booklets; and instant rebate coupons. Turnaround documents 12 are also used in remittance processing, which is a procedure for handling items returned with a payment. MICR encoded turnaround documents 12 can enable organizations to cut their resource and equipment costs.

Examples of documents 12 can include issuing checks such as Payroll checks, Accounts payable checks, Dividend checks, Benefit checks, Drafts, Warrants, Negotiable orders of withdrawal, for example. Issuing turnaround documents 12 refer to any type of volume transaction, whether negotiable or not, that requires data capture. Familiar examples of turnaround documents are: Credit card invoices; Insurance payment booklets; and Instant rebate coupons. Turnaround documents 12 can also used in remittance processing, which is a procedure for handling items returned with a payment. MICR encoded turnaround documents 12 enable organizations to cut their resource and equipment costs. MICR is also used for printing a variety of financial forms 12 which can include: Personal checkbooks; Limited transaction checks, such as money market checks; Direct mail promotional coupons; Credit remittance instruments; and Internal bank control documents, such as batch tickets.

MICR Characters 14

Referring to FIGS. 1 and 3, Magnetic Ink Character Recognition, or MICR, is a character recognition technology adopted mainly by the banking industry to facilitate the processing of cheques 12. A magnetic reader (not shown) can identify each magnetized character 14 and symbol of the MICR line using logical analysis algorithms of the magnetic wave patterns that the characters 14 produce.

The major MICR fonts used around the world are E-13B and CMC-7. The E-13B font (see FIG. 3) was chosen by almost all Indian, US, Canadian and UK checks 12 which now include MICR characters 14 at the bottom of the paper 12 in the E-13B font. Some countries, including France, use the CMC-7 font instead. The 14 characters of the E-13B font include the control characters bracketing each numeral block as transit, on-us, amount, and dash. One such stylized font, adopted by the American Banking Association, is called E-13B. FIG. 3 illustrates the E-13B numerical font characters.

An example of the CMC-7 MICR font. has control characters after the numerals as internal, terminator, amount, routing, and an unused character. In addition to their unique fonts, MICR characters 14 are printed with a magnetic ink or toner, usually containing iron oxide. Magnetic printing is used so that the characters 14 can be reliably read magnetically, even when they have been overprinted with other marks such as cancellation stamps. The characters 14 are first magnetized in the plane of the paper 12 with a North pole on the right of each MICR character 14, for example. Then they are usually read with a MICR read head of the reader which is a device similar in nature to the playback head in an audio tape recorder, and the letterforms' bulbous shapes ensure that each letter produces a unique magnetic waveform for the character recognition system to provide a character result.

The specifications for producing the E13B font using magnetic ink were accepted as a standard by the American Bankers Association (ABA). Groups that set standards and dictate the design specifications for document 12 encoding, processing equipment, and quality criteria for MICR printing, as a definitive basis for determining acceptable quality of a MICR document 12. Some of these group standards are: American Banking Association (ABA); American National Standards Institute (ANSI); United Kingdom—Association for Payment Clearing Services (APACS); Canadian Payments Association (CPA); Australian Bankers Association (ABA); International Organization for Standardization (ISO); France—L'Association Francaise de Normalisation. All of the E13B characters 14 are designed on a 7 by 9 matrix of 0.013 inch/0.33 mm squares. The minimum/threshold 20 for character width is four squares (or 0.052 inch/1.3 mm) for the numbers 1 and 2. The maximum/threshold width is 0.091 inch/2.3 mm for the number 8, 0, and four special symbols. Concerning other thresholds 20, all characters except the On-Us and Dash symbols have a height of 0.117 inch/3 mm. This does not correspond to an exact point size usually specified for fonts, but is between 8 and 9 points. The height of the On-Us symbol is 0.091 inch/2.3 mm, and the dash is 0.052 inch/1.3 mm. Both heights are multiples of the basic 0.013 inch/0.33 mm unit.

Optical Waveform 200,202

It is known that a magnetic reader (not shown) can identify each magnetized character 14 and symbol of the MICR line using logical analysis algorithms of the magnetic wave patterns that the characters 14 produce. However, while MICR characters 14 may be read magnetically and pass magnetic testing in comparison to magnetic waveform templates as is know in the art, it is recognised that optical characteristics of the same MICR characters 14 (in particular in the presence of competing optical print information such as background markings 18 and improper reflectance of the surface 13 of the document, for example) can cause the same MICR characters 14 to be rejected due to optical defects (e.g. voids in the lines/strokes of the characters 14, incorrect visual inter or intra spacing of character lines/strokes, and/or incorrect heights/widths of the character lines/strokes)of the printed characters 14.

Further, for non-MICR markings IM, there is no magnetic waveform to rely upon to objectively test the optical character of the markings IM. Accordingly, there exists a substantial disadvantage with correct document 12 imaging techniques and corresponding optical quality testing techniques for OCR read visual features IM of the documents 12 as print contrast signal (PCS) compliance of the check document 12 design can be subjective as each tester can get a different print contrast signal of a check 12 depending upon the static background 18 image sample that is selected by the tester. This manual testing process is inefficient in cost and time due to the check 12 designs that may pass some PCS testing only to fail PCS standards when processed by other check image processing equipment. MICR 14 testing via magnetic methods does not have the added potential for error generation of optical testing due to the print contrast and/or reflectance issues inherent in the OCR reading of the print characters 14, for example to counteract the effects of background images 18 on the document surface 13, as the document print surrounding the MICR characters 14 should not contain magnetic ink.

Figure 5:
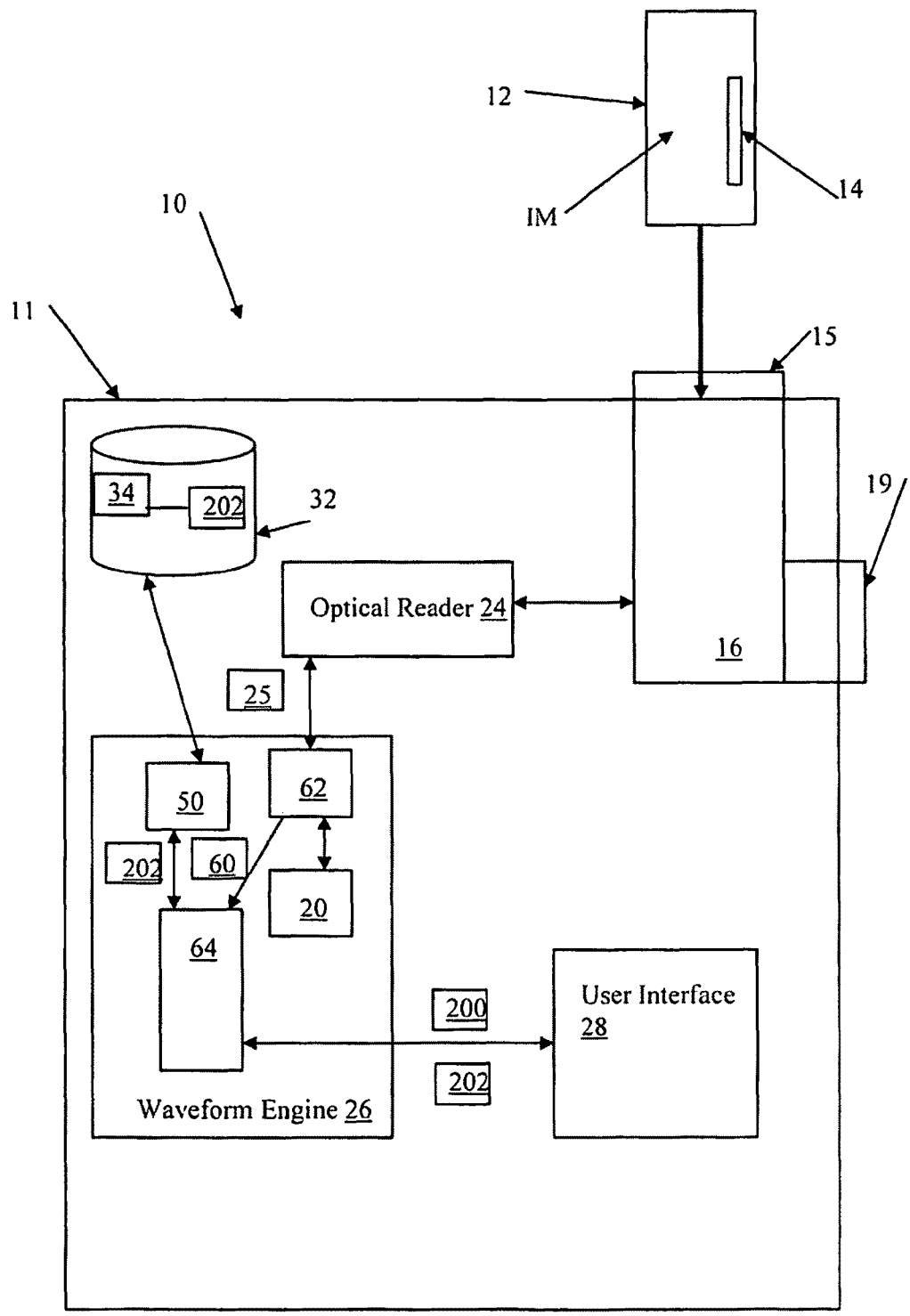
FIG. 5 shows an example optical waveform generator system for processing the document of FIG. 1.

Referring to FIG. 5, shown is a system/apparatus 10 configured for calculating optical waveforms 200 markings IM (e.g. MICR characters 14) based on their optically obtained attributes (line width, line height, line spacings, line optical contrast intensity, etc.) via an optical image reader 24 and corresponding optical waveform generation engine 26. The apparatus 10 is configured to read a document 12 having one or more printed markings IM (e.g. Magnetic Ink Character Recognition, or MICR, characters 14). The apparatus 10 can have a transport mechanism 16 (e.g. a series of drive rollers, gears, belts, etc. configured to direct/transport the document 12) for physically translating the document 12 past the optical reader 24 configured for identifying optical characteristics 25 of the markings IM for use in generating the optical waveform 200 (see FIG. 5). The optical reader 24 is configured for identifying a digitized image 25 of each marking IM, as further described below.

The document transport mechanism 16 can include, for example, a single pass document track such that the document transport mechanism 16 conveys the document 12 past the readers 24. The reader device 24 performs operations on the document 12, such that the document transport mechanism 16 receives 17 the document 12 from an input 15 (e.g. slot), routes the document 14 past the reader 24, and then directs the document 12 to an output slot 19. The reader devices 24 (e.g. camera or scanner) is positioned in the housing 11 so as to be able to take electronic images of one or more markings IM on the surface 13 of the document 12.

It is also recognised that the transport mechanism 16 could be configured to translate the readers 24 over the surface 13 of a stationary document 12. It is also recognised that the transport mechanism 16 could be configured to translate the reader 24 over the surface 13 of a moving document 12. In any event, it is recognised that the transport mechanism 16 is configured to provide relative movement between the surface 13 (see FIG. 1) of the document 12 and the reader 24.

Referring again to FIG. 5, the apparatus 10 can also have a database 32 containing optical patterns 34 representing respective standardized optical waveform templates 202 (see FIG. 7a, 7b) having predefined optical waveform characteristics 52 (peaks, peak spacing, peak height/amplitude, reference spacing, etc.—see FIG. 6) of the characters IM. Each of the patterns 34 can be used by an analysis module 50 (and/or by the individual reader 24) to optically recognise the recorded characters IM in the optical information 25 based on comparison to each of the waveform templates 202 to optically recognise the recorded characters IM in the optical information 25 based on generated optical waveform 200 characteristics of the character IM, as further described below. For example, as shown in FIG. 6, it is apparent that there would be a correlation between the optical dimensions 52 (line/stroke placement, line/stroke height/width) of the marking IM and the corresponding optical waveform 200 waveform characteristics 54 (e.g. "positive peak values", "negative peak values", and "substantially zero/reference values" which are arranged in predetermined combinations and positioning with respect to each other) to the corresponding standard waveform features of the waveform templates 202.

Differences between the waveforms 200, 202 could be compared by the analysis module 50 (for example of the generation engine 26 or as a separate module/engine, as desired) for each of the respective characters IM to determine what defects in the characters IM are a consequence of errors in the generated optical waveform 200 of the characters 14 compared to the standard waveform template 202. The apparatus 10 also has a user interface 28 for displaying comparison information 30 or any other analysis information 30 generated by the analysis module 50 based on the compared information 200,202, as further described below.

Generation of Optical Waveforms 200,202

Figure 8:
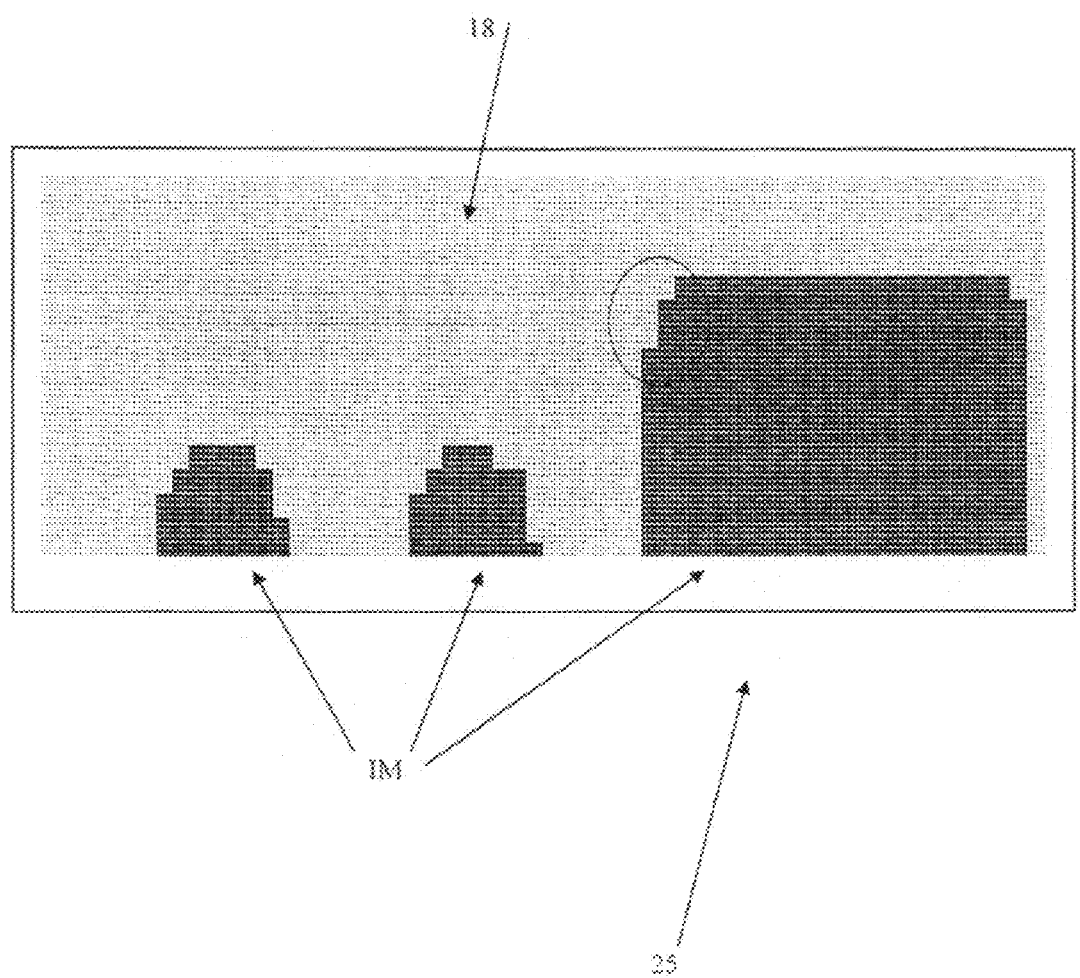
FIG. 8 shows captured optical image data of the optical reader of FIG. 5.
Figure 9:
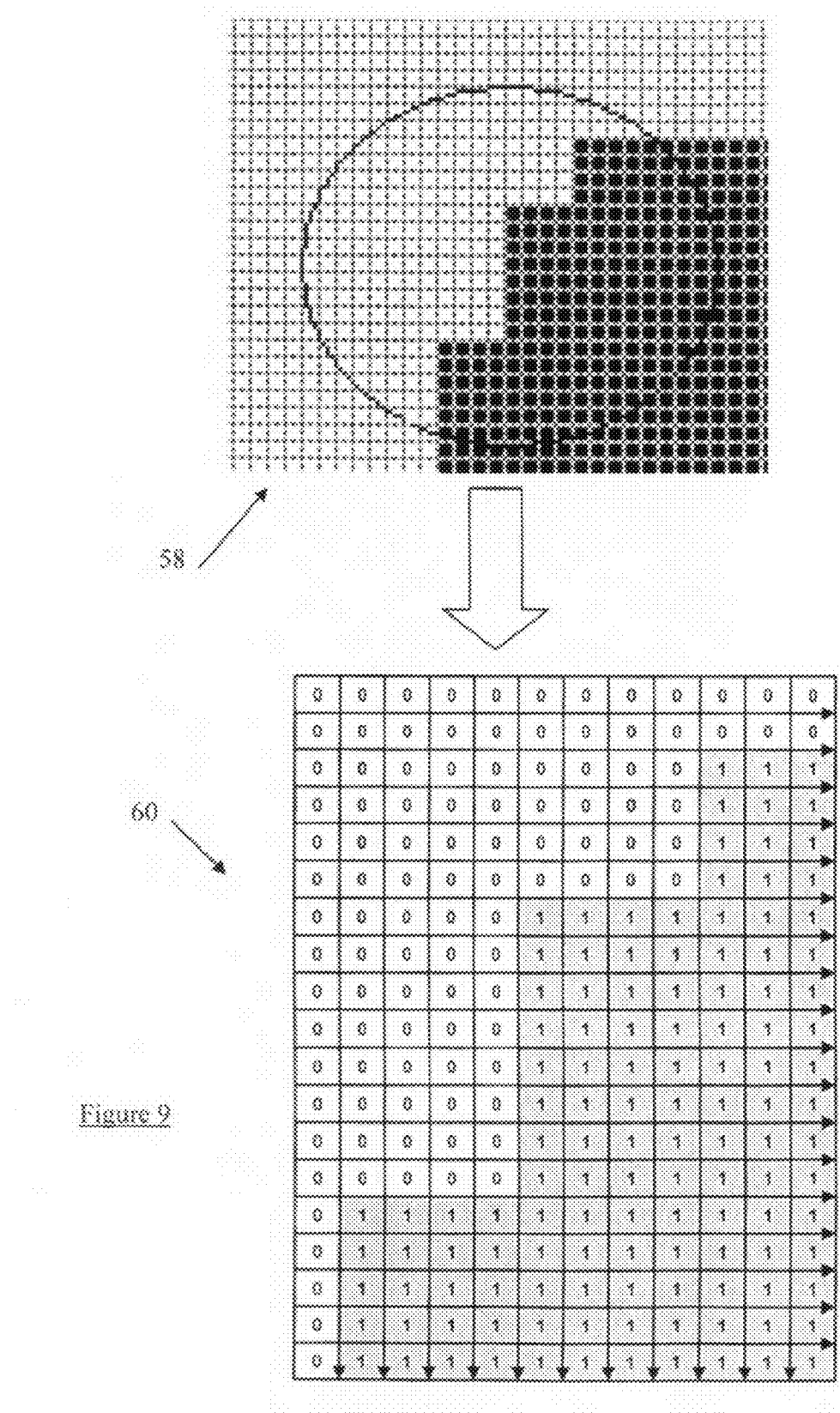
FIG. 9 shows an example conversion of the optical image data of FIG. 8.

Referring to FIGS. 5,8,9, the optical reader 24 is used to determine the optical image data 25 of each desired marking IM (e.g. MICR character 14) scanned or otherwise optically imaged off the surface 13 of the document 12 (see FIG. 1). It is recognised that not only are the MICR characters 14 identified by the optical reader 24, also the other optical elements IM of the document 12 can also be identified to comprise a digitized image 17 of the document 12 (see FIG. 3) for use in subsequent digitization of the image data 25 to account for reflectance and/or print contrast effects, as further described below. It is recognised that the operation of the image reader 24 provides for markings IM (e.g. MICR characters 14) Area Image Processing to obtain the electronic image data 25 representing the optical print features of the markings IM on the surface 13 of the document 12.

Optical readers 24 typically use a light source and some type of photosensitive matrix array to convert an image of the marking IM into a set of electrical signals. Optical character recognition, usually abbreviated to OCR, is the mechanical or electronic translation of images of handwritten, typewritten or printed text (usually captured by a scanner) into machine-editable text. It is used to convert documents 12 into electronic files, for instance. By replacing each block of pixels that resembles a particular character (such as a letter, digit or punctuation mark) or word with that character or word, OCR makes it possible to digitize and store the identified MICR characters 14 and the other optical features IM. Optical character recognition (using optical techniques such as mirrors and lenses) and digital character recognition (using scanners and computer algorithms) are considered to include digital image processing as well.

Print Contrast/Reflectance Conversion Module 62

The waveform generation engine 26 can use a print contrast module 62 to use knowledge of colour and printed colour reflectance behavior and/or print contrast characteristics of the imaged markings IM 25 (including any background 18, reflectance issues, or any other extraneous optical noise) to create a converted PCS map 58 based on the use of print contrast thresholds 20 and/or reflectance thresholds 20, for use in generation of various optical waveform attributes 200 of the printed MICR characters 14, for example, and to optionally conduct optical tests based on waveform 200,202 comparison.

For example, the OCR process can also include correction for background 18 (FIG. 8) images to be removed from the resulting image 58 of the document. Processes for removal of the background 18 can be done through various thresholding 20 (via the module 62) to convert the gray scale signal to a black/white signal 58 and analog-to-digital pixel conversion to transform the black/white signal to a series of pixels (e.g. binary pixel map 60, such as a conversion to a pixel matrix) having a first unique value (e.g. of "one"), corresponding to a black picture element, and a second unique value (e.g. "zero"), corresponding to a white picture element. In this manner, the pixel map 60 has been corrected for print contract and/or reflectance issues that are present in the document 12.

Referring again to FIG. 5, as the document 12 is moved relative to the camera/imager 24, the entire document 12 may be imaged or only a portion of the document 12 may be imaged. The imaged area can includes the monetary amount IM of the document 12, the MICR character 14 field, the bank of origin 14, check number IM,14, customer account number 14, and similar information, shown within the MICR character 14 field.

Optical image data 25 is obtained from the document 12 and processed as follows, for example. Successive vertical scans of picture elements, or pixels 25, are provided by the imager 24, starting at the right side of the check 12 and proceeding towards the left side thereof. In the embodiment described, camera 24 is capable of generating a resolution (e.g. greater than 0.001" sample rate). The output 25 of camera 24 can be an analog gray scale signal provided to a line imager (of the module 62) for digitizing and processing. The line imager 62 can perform various processing tasks including thresholding 20 to convert the gray scale signal 25 to a black/white signal 58 (e.g. having removed extraneous markings such as background and/or having corrected reflectance issues) and analog-to-digital pixel conversion to transform the black/white signal to a series of pixels 60 having values of "one", corresponding to a black picture element, and "zero", corresponding to a white picture-element. The line imager 62 can perform the character formatting to isolate and refine the pixel information associated with a character 14 being imaged by camera 24, due to print contrast signals and/or background removal and other extraneous mark removal (e.g. print ink splatter).

Accordingly, in view of the above, the module 62 facilitates the optical data 25 to be converted to the bitmap 58 and then converted to a matrix M (e.g. ordered series of pixels 60), so that each matrix element mij value corresponds to a bitmap pixel: e.g. mij=1 if a pixel is "black" and mij=0 if a pixel is "white". Note, that matrix values can be flipped horizontally, is the marking IM reading 24 starts from the right edge of the MICR document 12.

Waveform Generation Module 64

Referring again to FIGS. 5,6,9 a waveform generation module 64 can be used to convert the pixel map/matrix 60 to the corresponding optical waveform 200 having a plurality of waveform characteristics 54 corresponding to a plurality of optical dimensional print characteristics 52 of the imaged markings IM, as represented by the pixel map/matrix 60.

The generation module 64 is configured to perform the following example steps for Matrix 60 processing: a) Calculate Pixel Size and Signal Level; b) Determine signal level sequences; c) Calculate Decay Factor for Sequence Pixel; d) Transform Matrix; and e) Calculate Waveform Values 200. In the below example operation the following notations are used: Iw—image width in pixels; Ih—image height in pixels; Idpix—image horizontal resolution in dots per inch (dpi); Idpiy—image vertical resolution in dots per inch (dpi); Pw—pixel width; Ph—pixel height; Ps—pixel signal level; and M={mij}—scanned image matrix, where i=0, Ih-1 and j=Iw-1. the following example operation is described for scanning and conversion of MICR characters 14 to their corresponding character waveforms 200, by example only. Therefore, it is recognised that the following operation could also apply to scanning and conversion of printed markings IM in general and to their correspondingly generated marking waveforms 200.

In terms of the above described operation of the reader 24 and conversion module 62, a MICR area of the MICR document 12 is scanned and the scanned image 25 is converted into a dynamic PCS map 58 at the specified threshold 20 (e.g. to be in compliance with the ANS standard the PCS threshold value must be set to 0.6), and the PCS map 58, as a binary image (bitmap), is used to determine the matrix representation 60 of the original MICR area. The bitmap 58 obtained is converted as represented by the matrix M (e.g. series of ordered pixels 60), so that each matrix element mij value corresponds to a bitmap pixel: mij=1 if a pixel is "black" and mij=0 if a pixel is "white". Note, that matrix values can be flipped horizontally, where the reading 24 starts from the right edge of the MICR document 12.

In terms of the operation of the module 64 to Calculate Pixel Size and Pixel Signal Level, the pixel size and pixel signal level depend on the scanned image 25 resolution and can be calculated as following:

$$Pw = 1/Idpix;$$

$$Ph = 1/Idpiy.$$

The pixel signal level Ps is derived from the nominal MICR Character 14, for ANS Standard ON-US character is used as a nominal one; it is known that the height of 0.078 (optional: minus 2*radius) inch produces 100 signal units, hence:

$$Ps = [\text{known signal level}] * Ph/[\text{known height}].$$

For Example, for nominal ON-US character and an imaged scanned at 600 dpi:

$$Ph = 1/600 = 0.0017 \text{ inch; and}$$

$$Ps = [\text{known signal level}] * Ph/[\text{known height}] => 100 * 0.0017/0.078 = 2.1368 \text{ (signal units per pixel)}.$$

In order to determine signal level sequences, the module 64 is configured to Let $S_i^k = \{m_{ij}\}, j \in [j1, j2]$, where k is sequence index in ith row and j is a matrix column index.

| Columns | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Rows i | 0 | 0 | 0 | 0 | 0 | 0 | 0 | 1 | 1 | 1 | 1 | 1 | 1 | 1 | 1 | 0 | 0 | 0 | 0 | 0 | 0 |
| i+1 | 0 | 0 | 0 | 1 | 1 | 1 | 1 | 1 | 1 | 1 | 1 | 1 | 1 | 0 | 0 | 0 | 0 | 0 | 0 | 0 | 0 |

The ith row on the example matrix 60 values above has three sequences:

$$S_i^0 = \{m_{ij}\},\ j \in [0,6]$$

$$S_i^1 = \{m_{ij}\},\ j \in [7,14]$$

$$S_i^2 = \{m_{ij}\},\ j \in [15,20]$$

The (i+1)th row on the example matrix 60 values above has three sequences:

$$S_{i+1}^0 = \{m_{ij}\},\ j \in [0,2]$$

$$S_{i+1}^1 = \{m_{ij}\},\ j \in [3,12]$$

$$S_{i+1}^2 = \{m_{ij}\},\ j \in [13,20]$$

For each sequence $S_i^k$, where k is sequence index in ith row, its physical width can be calculated as $$W(S_i^k) = L(S_i^k) * P_W,$$

Where $L(S_i^k)$ is sequence length in pixels and is equal to the number of matrix 60 elements forming the sequence. For each sequence element $m_{ij}$ its physical offset $x(m_{ij})$ from the sequence start can be calculated as $$x(m_{ij}) = (j - j1) * P_W$$

In order to Calculate a Decay Factor for Sequence Pixel, the module 64 can be configured as for each signal sequence element the Decay Factor d(x) can be calculated. The decay factor is used to calculate the contribution of each pixel to the resulting waveform.

If sw is $W(S_i^k)$ and x is $x(m_{ij})$, than pixel decay d(x) can be calculated as:

$d(x)=0$, if no signal sequence found in the matrix row $d(x)=f(x)-f(sw-x)$, if signal exists $d(x)=f(sw-x)-f(x)$, if signal does not exists $d(x)=f(sw-x)$, if signal does not exist and the sequence is the first row sequence $d(x)=f(x)$ if signal does not exist and the sequence is the last row sequence Where:

$$f(x) = \frac{1}{\exp\left(\frac{x^2}{\sigma^2}\right)},\ \sigma = 0.013'',$$

for example.

Referring to FIGS. 5,6,9, the sequence elements of the Matrix 60 can be transformed using the decay factor as all matrix elements $m_{ij}$ are substituted as following:

$$m_{ij} = d(x) * P_S$$

In turn, the calculated optical character waveform 200 values are determined as signal level values (y) and their horizontal offset (x) can be calculated as:

$$y_j = \sum_{i=0}^{l_h-1} m_{ij}$$

$$x_j = j * P_W$$

The resulting distribution of signal level values Y over the corresponding positional spacing X of the MICR characters 14 results in the generation of the optical waveforms 200, such that the peaks, valleys, and reference/zero values 54 are correlated to the relative spacing/width of the lines (e.g. strokes) 52 of the print character 14 dimensions. The term optical waveform 200 can refer to the shape of a graph of the varying quantity of determined optical signal Y against the spacing/layout distance X of the corresponding print character 14 characteristics. It is recognised that other optical waveform 200 shapes (other than the arcuate shape as shown) can be used, such as step functions, saw-tooth, square, triangle, etc.

Accordingly, referring to FIG. 6, the print dimension characteristics 52 are correlated with the optical waveform characteristics 54, as the waveform generation direction is related to the optical read 24 direction. For example, the relative peak placement of the determined optical waveform 200 is correlated to the relative edges placement of the printed marking IM lines/strokes 52, the spacing between the peaks is correlated to the width between the edges of the print character 14 lines/strokes and/or the spacing between adjacent lines/strokes, the amplitude of the optical waveform peaks 200 (in the Y direction) is related to the height(s) of the lines/strokes of the printed character 14 at a particular location X, and/or the amplitude of the optical waveform peaks 200 (in the Y direction) is related to the a combination of the heights of the multiple overlapping lines/strokes (in the Y direction—see FIGS. 7b,c) of the printed character 14 at a particular location X.

In terms of character features, optical properties (e.g. print dimensions 52 such as character radius, line/stroke width, line/stroke height, inter-character/line/stroke 14 spacing, etc.) of the markings IM are understood, once the conversion module 62 has corrected for contrast and/or reflectance issues of the document surface 13. For example, the stroke width 52 of E-13B characters 14 can vary from 8 to 15 mil in the X direction. In other words, the distance count in X between two adjacent peaks 54 in the optical waveform 200 can vary from 10 to 19 counts instead of 16 counts due to printing quality control problems. All of the above variances in determined optical signal level and distribution (e.g. in X) from a selected optical standard such as templates 202 (with respect to above or below defined thresholds/criteria 20) can be used to identify optical print dimension errors in the imaged print characteristics 25.

Figure 7A:
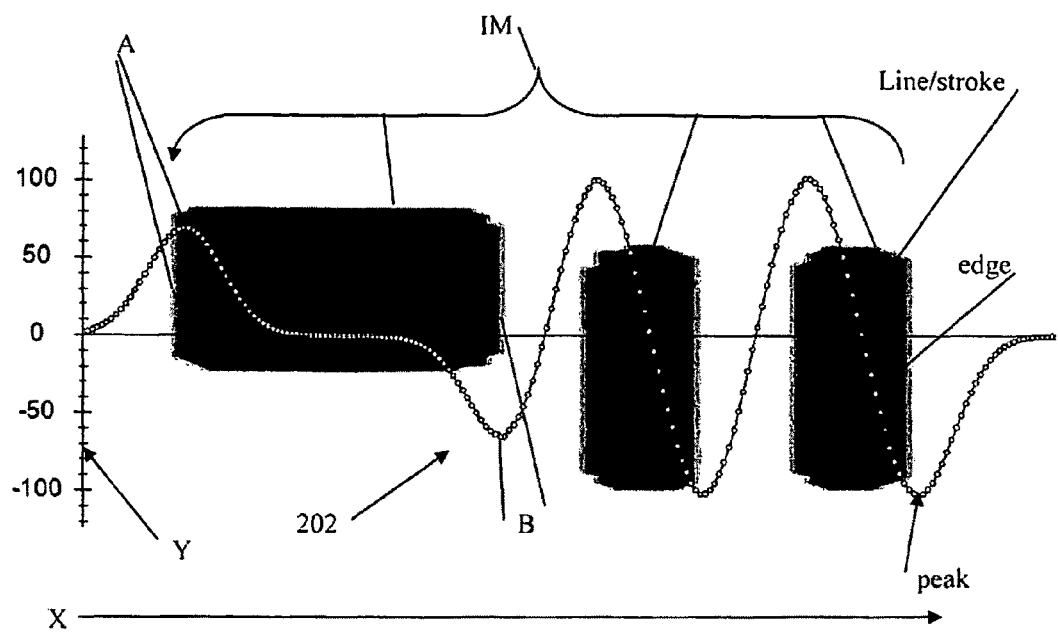
FIGS. 7*a,b,c* show example template optical waveforms for use in comparing to the generated optical waveform of FIG. 6.
Figure 7B:
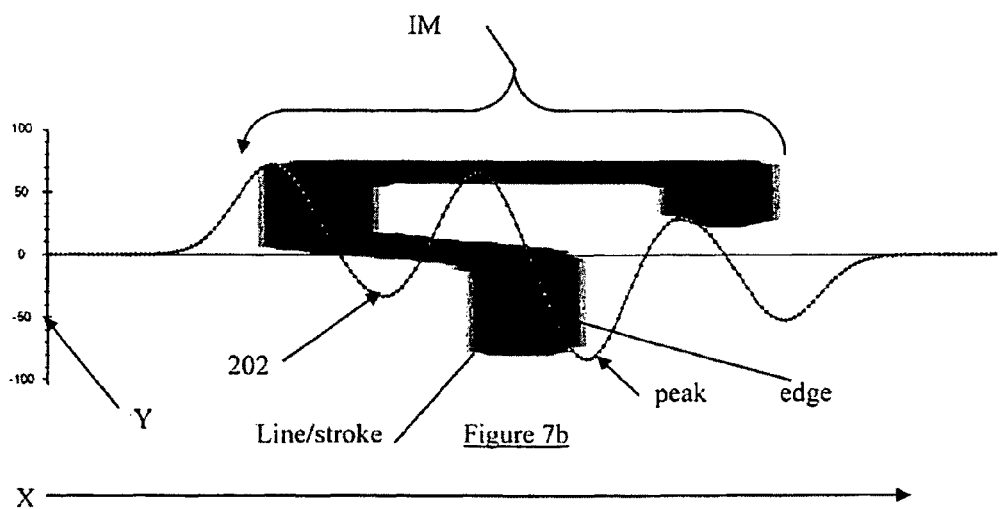

In view of the above, the optical templates 202 of FIGS. 7a,b,c can be used to represent the theoretical optical waveform 202 in the absence of any contrast and/or reflectance issues (i.e. the optical templates 202 can be generated based on a perfect/optimum print contrast signal and/or lack of reflectance effects. As can be seen, the peaks of the optical waveform template 202 are aligned with the edge of the lines/strokes, which provides for, as the leading edge A of the line/stroke generates a change in the determined optical signal level, producing corresponding leading peak A of the optical waveform 202. There may be no change in the determined optical signal level between A and trailing edge B of the stroke (see FIG. 7*a*). As trailing the edge B is encountered, the optical signal level is determined (as discussed above in relation to the example operation of the module 64) producing the corresponding trailing peak B of the waveform 202.

The optical waveform 200,202 can also have waveform characteristics 54 such that for the leading edge A of a vertical stroke/line, this results in a signal level/peak of one polarity, while a decrease in ink for the trailing edge B results in a signal level/peak of the opposite polarity. Not shown, it is recognised that as an alternative embodiment the presence of edges in the print dimensions can be used to generate the corresponding peaks all in the same direction, akin to DC current waveforms, as compared to the example embodiment in which leading and trailing edges are represented using peaks of opposite polarity, akin to AC current waveforms. In any event, the term leading edge can be used to represent the transition from absence of a character line/stroke to the character line/stroke itself (e.g. from white to black). Further, the term trailing edge can be used to represent the transition from the presence of a character line/stroke to the absence of the character line/stroke (e.g. from black to white).

Analysis Module 50

Therefore, assuming uniform ink width, height, and/or stroke relative spacing (vertically and/or horizontally) within and/or between characters 14, any the optical waveform 200 differences (as compared to the templates 202) can be due to character 14 features 52 (e.g. strokes/lines) that are not in compliance with the optical print standard associated with the thresholds 20. For example, the oversize in height (e.g. width of the stroke in the Y direction), such as the Relative signal amplitude is a function of the amount of flux density change. It can be seen that the read head signal is a differentiation of the character's 14 magnetic intensity. By integrating this signal, the "character waveform" 200 is developed which indicates the total amount of ink passing the read head gap. It is this waveform that can be optionally initially analyzed and recognized through comparison to the patterns 36 by the decision logic of the MICR system 22.

Determined optical waveform 200 features can include determined "positive peak values", "negative peak values", and "substantially zero values" 54 as Y signal levels (based on a converted image data 25 to account for print contrast signal and/or reflectance effects) which are arranged in combinations in the X direction (e.g. based on the print characteristics 52) for the marking IM dimensions (e.g. for characters 14 within the E-13B font). On the other hand, optical waveform template 202 features can include standardized "positive peak values", "negative peak values", and "substantially zero values" as Y levels which are arranged in predetermined combinations in the X direction (e.g. template patterns 34) for the predefined standard marking IM dimensions (e.g. for predefined characters 14 dimensions of the E-13B font standard). The module 64 can be configured to match/compare the determined "features" 54 against all the templates 202 for the E-13B font. A template 202 can be define as a predefined particular combination of positive, negative and substantially zero values 54 for an individual character and the positions they are allowed to occupy for an individual character 14 (or marking IM) based on predefined standard print dimensions 52.

The module 64 is therefore configured to apply optical waveform feature recognition rules (based on the templates 202) to the determined "features" 54 to determine if the features 54 actually match the features included in one of the templates 202 well enough to be recognized as that particular character 14, for example.

The following print quality specifications/thresholds 20 of optical errors for MICR characters 14 can be, for example: Horizontal position; vertical position including permitted vertical variation from character 14 to character 14 and/or proper vertical placement of the entire MICR line on the document 12; skew as the rotational deviation of a character 14 from the vertical with reference to the bottom edge of the document 12; character-to-character spacing as the distance from the right edge of one MICR character 14 to the right edge of the next; character size; voids; or deletions as the absence of ink; extraneous ink or spots as unwanted bits of ink that result from unavoidable splatter and smear of the magnetic printing inks, which may be invisible to the unaided eye but can affect the wave patterns 200 of MICR characters 14 depending upon the spots size, quantity, and position; Debossment; and stroke width errors (e.g. in stroke width and/or height) affecting optical signal strength/level.

Other example optical defects are: an over/under size width of the MICR character 14; an ink void in the MICR character 14; an extraneous ink portion adjacent to the MICR character 14; an irregular radius of the MICR character 14; an over/under size height of the MICR character 14; and an irregular edge (e.g. not smooth but ragged) of the MICR character 14. These optical defects can be associated with dimensional feature defect thresholds 20 of the character standard as the optical standard defined via the templates 202. The optical defect can also be: an extraneous ink portion adjacent to the MICR character 14; and/or improper spacing between an adjacent MICR character 14 and the MICR character 14.

It is recognised that the character 14 matching can be performed by the optical reader 24 itself and included as part of the optical data 25 and/or can be performed by the analysis module 50. Further, it is recognised that one or more functions of the conversion module 62 and/or the waveform generation module 64 can be performed by the reader 24, as desired. For example, the reader 24 can be configured to include the OCR capabilities to capture the image data 25, the ability to do conversions related to print contrast and/or reflectance values, and/or the ability to generate the optical waveform 200 from the matrix 60.

Operation of the System 10

Referring to FIGS. 1, 5, 6,13, shown is a method 300 for determining an optical waveform 200 based on a plurality of print features 52 of a selected marking IM of a document 12. At step 302, the reader 24 obtains optical image data 25 representing the print features 52 of the selected marking IM. At step 304, the conversion module 62 corrects at least one of print contrast or reflectance of the print features 52 in the optical image data 25 using respective print contrast thresholds 20 or reflectance thresholds 20 to produce a converted pixel map 60 of the selected marking IM, the pixel map 60 containing an ordered sequence of values. At step 306, the generation module 64 transforms the print features 52 represented in the converted pixel map 60 to a plurality of corresponding waveform features 54 to produce the optical waveform 200 of the selected marking IM, the corresponding waveform features 54 including a plurality of spaced apart peaks representing respective optical signal levels of the print features 52.

It is recognised that the selected marking IM can be is a magnetic ink character recognition (MICR) character 14 and the plurality of print features 52 can include a line having a printed width and a printed height and the selected marking can be a plurality of magnetic ink character recognition (MICR) characters 14 of a MICR line in the document 12. The method can have a further step 308 of removing one or more background 18 print features from the optical image data 25 in the correcting step.

The selected marking IM can include a combination of distributed lines in at least one of a vertical direction or a horizontal direction on the document 12, the combination of distributed lines either continuously connected or spaced apart from one another, wherein the combination of distributed lines can be a MICR character. The map 60 can be a pixel matrix having one binary value representing the presence of at least a portion of the printed combination of distributed lines in a first pixel and the other binary value representing the absence of any of the printed combination of distributed lines in a second pixel. The waveform features 54 can include features selected from the group consisting of: peak spacing between adjacent peaks; peak amplitude; a reference value between peaks representing a lack of the printed features; only positive peaks; only negative peaks; and both positive and negative peaks.

The method 300 can also include an optional step 310 of comparing the generated optical waveform 200 against a template optical waveform 202 based on print features 52 defined in a print standard of the selected marking IM.

Alternative Embodiment of the Print Contrast Signal Conversion Module 62

Figure 10:
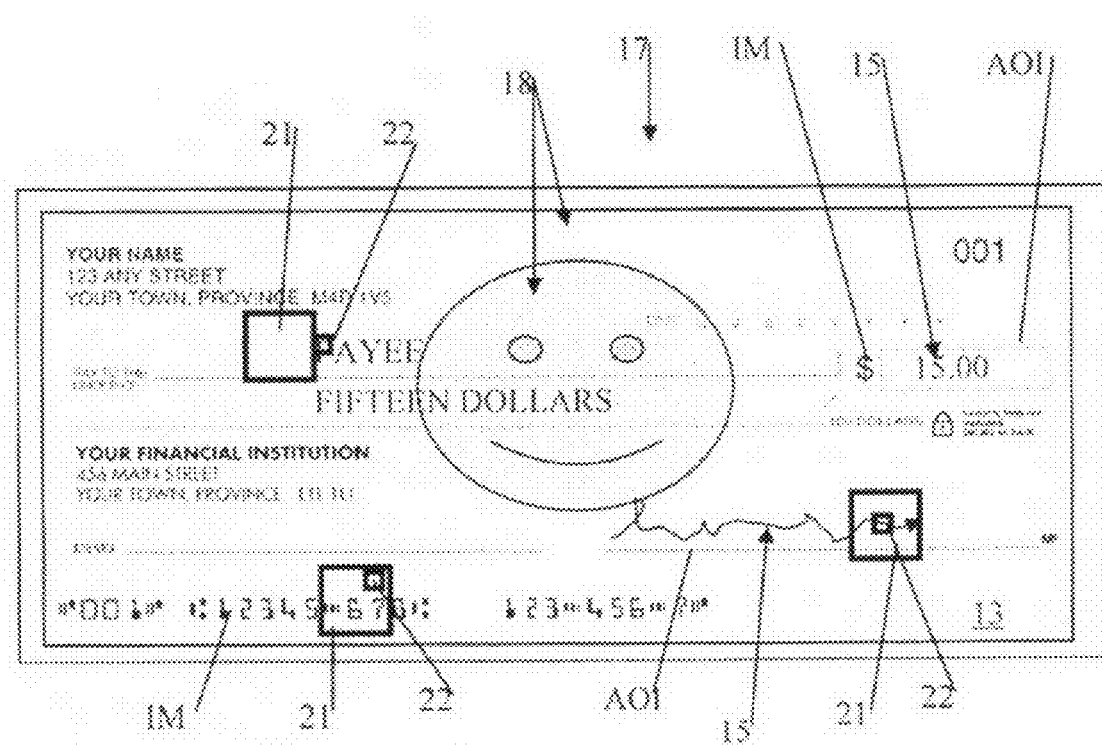
FIG. 10 shows an example further embodiment of the document of FIG. 1.

In optical character recognition for the present system 5, see FIG. 10 note, not to scale, the PCS is a measure of the contrast between a selected target portion 21 (e.g. a target pixel or group of pixels) of the imaged document 12 (see FIG. 1) and a defined region 22 of the imaged document 12 adjacent/around the selected target portion 21 (e.g. a series of background image 18 pixels adjacent to the target pixel), note—the absolute sizing of the target portion 21 and the defined region 22 are not to scale and are for illustrative purposes only. The target portion 21 is characterized based on location of the target portion 21 on the surface 13 of the document 12. For example, in the case of a target portion 21 located in the dollar sign area (e.g. IM) of the check 12, the desired PCS will be large (e.g. the dollar sign should have a high contrast as compared to its surrounding background image 18). In the case of selected AOIs (e.g. Payee, Signature, etc.), the PCS should have a negligible value (e.g. the AOIs should be blank when the background image 18 is digitally removed from the image 17 of the document 12). In the case of the endorsement line and phrase "Endorsement signature or Stamp" (e.g. IMs), the PCS should be 0.60 minimum (e.g. the endorsement line and indication IM should be discernable from the background image 18 in the digital image 17 of the document 12).

It is recognised that the target portion 21 may contain only a portion of the AOIs/IMs and the defined region 22 may contain only a portion of the background image 18, the target portion 21 may contain only a portion of the background image 18 and the defined region 22 may contain only a portion of the AOIs/IMs, the target portion 21 may contain both a portion of the background image 18 and a portion of the AOIs/IMs, and/or the defined region 22 may also contain both a portion of the AOIs/IMs and a portion of the background image 18, for example. It is also recognised that both the target portion 21 and the defined region 22 may both contain only a portion of the background image 18, for example. The size of the defined region 22 can selected so as to provide for at least some of the background image 18 is included in each target portion 21 selected iteratively about the surface 13 of the document 12 (see FIG. 13). The size of the defined region 22 can be chosen to be larger than the size of the target portion 21. For example, the target portion 21 can be one or more pixels that is smaller in extent than the relatively larger (in relation to the number of pixels of the target portion 21) number of pixels comprising the defined region 22. For example, the target portion 21 can be one or more pixels (e.g. one pixel) that would fit within (e.g. centered) the grouping of defined region 22 pixels (e.g. comprising the extent of a ⅛ inch square area as per the ANSI, CPA standards).

Contrast can be defined as the range of optical density and/or tone on a document 12 as the extent to which adjacent areas (e.g. background image 18 adjacent to printed/written critical data 15 to be input in the AOIs, background image 18 adjacent to IM) on the document 12 differ in brightness. It is recognised that the degree of difference in lightness, brightness (i.e. contrast) between the AOIs/IMS and the adjacent background images 18 makes the critical data 15 (when input) and the IMs more or less distinguishable in the digital image 17 of the document 12. For example, the print contrast signal (PSC) can be calculated as=100% (defined region 22 reflectance−selected target portion 21 reflectance)/(defined region 22 reflectance). This means that measured reflectance (Rr) of a dynamically selected defined region 22 of the document image 17 can be compared with the measured reflectance (Rt) of the selected target portion 21 of interest, i.e. PCS=(Rr−Rt)/Rr. Examples of PCS thresholds 20 are: 0.3 maximum for all target portions 21 located within the CAR AOI; 0.6 minimum for all MICR characters (i.e. PCS with respect to the clear band background around the MICR characters); 0.6 minimum for the dollar sign; 0.3 maximum for the MICR clear band abound the MICR characters; etc.

Reflectance can be defined as the relative brightness, or the amount of light reflected from each particular marking/indication (e.g. background image 18, IM, etc.) that would be present on the surface 13 of the manufactured document 12. For example, for checks 12, the amount of light is reflected from each particular marking sample of paper and/or ink. An example reflectance scale is a range of 0% to 100%, where 0% is absolute black (considered the darkest colour/shade) and 100% is maximum diffuse reflectance of the entire incident light (considered the lightest colour/shade). For example, the ANSI standard for physical checks 12 for reflectance is specified at not less than 40% in all areas of interest AOI with the exception of the convenience amount area (i.e. CAR which contains the numerical amount), which is not less than 60%. If the background features 18 are recorded in the image 17 of the document 12 as too dark (i.e. reflectance is too low in the AOIs), the critical data 15 could drop out (e.g. be occluded) due to insufficient contrast between the overlapping background image 18 and critical data 15 in the image 17 taken of the document 12. The Convenience Amount Recognition (CAR) is the numerical amount area AOI shown in FIG. 1. It is critical that the banks can read the CAR rectangle and its corresponding print contrast signal (PCS) to assure the printed rectangle dropped out and did not interfere with automatic machine recognition of handwritten amounts in bank imaging equipment (not shown). It is recognised that low reflectance causes low contrast and unintended dropout of vital information (e.g. critical data 15, IMs), while high contrast background patterns 18 can cause random background clutter to remain in the binary images 17 that renders critical data 15 (e.g. handwriting) and/or IMs ambiguous at best.

Background clutter can be measured by creating the binary image 17 of the document 12 (e.g. not containing critical data 15 input into the AOIs), then converting the image 17 from gray scale to black-and-white using a standardized conversion process as is known in the art, and then measuring the clusters of black pixels (paxel count) which remain after conversion. As part of tested image 17 quality for documents 12, specifically the requirements (e.g. ANSI) focus on the areas of interest AOI for background drop out, such that the background features 18 will not occlude or otherwise adversely affect the image quality of the critical data 15 resident in the areas of interest AOI. As mentioned above, the paxels are formed in the image 17 through low reflectance of the background features 18 and/or the document material 16 in the areas of interest AOI. It is considered that the critical data 15 on the surface 13 of the document 12 should show up in the image 17 as darker than the surrounding background features 18 that may overlap the areas of interest AOI.

The results of the PCS calculation described above could be an indication of where the formation of dark (e.g. black) pixels, paxels, and/or paxel strings/combinations 22 in the image 17 would occur that would make it difficult for manual (by person) and/or automatic (e.g. OCR) recognition/identification/detection of the critical data 15 in the AOIs and/or the IMS of the image 17. One example of the paxel is a 0.01" by 0.01" block of black pixels (e.g. an example smallest area of a physical document 12 considered in capturing the electronic image 17. The paxel (e.g. a grouping of pixels) has to be complete (e.g. 66%), or at least a specified number of pixels (e.g. 6 of 9 pixels) in the paxel. For example, it has been found that individual pixels may not constitute a legibility problem, but 0.01" by 0.01" blocks of problematic legibility does, especially when joined together in the string of paxels.

Figure 12:
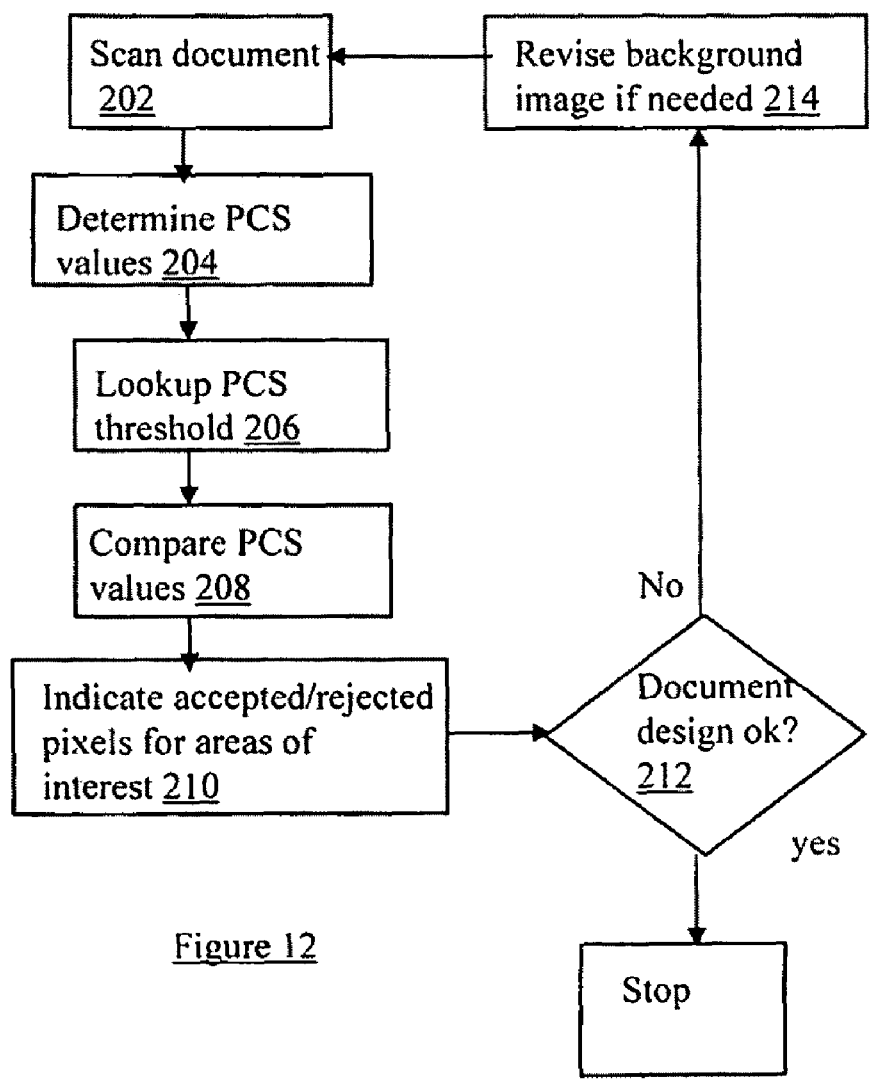
FIG. 12 shows a block diagram of an example operation of the document analysis environment of FIG. 11.

On the contrary to current systems the dynamic PCS based measuring process 200 of FIG. 12 is configured to determine the PCS for each target portion 21 selected iteratively over the surface 13 of the document 12, such that each target portion 21 is compared to a dynamically selected defined region 22 adjacent/around the target portion 21, so that the check designer can rearrange graphic features or modify the background features 18 for compliance of the design of the document 12 for PCS standards. The defined region 22 can be selected so as to be constant (for example) in size and positioned iteratively across the surface 13 at different locations 39 corresponding to the respective target portion 21. For example, the position/location 39 of each successively used defined region 22 changes to correspond with the location 39 of the respective target portion 21.

It is recognised that any target portions 21 that have a calculated PCS values not satisfying the specified PCS threshold(s) 20 (for the corresponding locations on the surface 13 of the document), these target portions 21 could be prone to forming the black pixels or grouping of pixels/paxels and therefore important information (i.e. critical data 15, IMs) risk being occluded in the image 17 created from the respective document 12. In other words, those target portions 21 that have PCS values that satisfy the specified PCS threshold(s) 20 can be considered by the document 12 designer as having design parameters that would inhibit adverse image quality of critical data 15 and/or IMs in the recorded digital image 17 of the surface 13 of the document 12.

System 5

Figure 11:
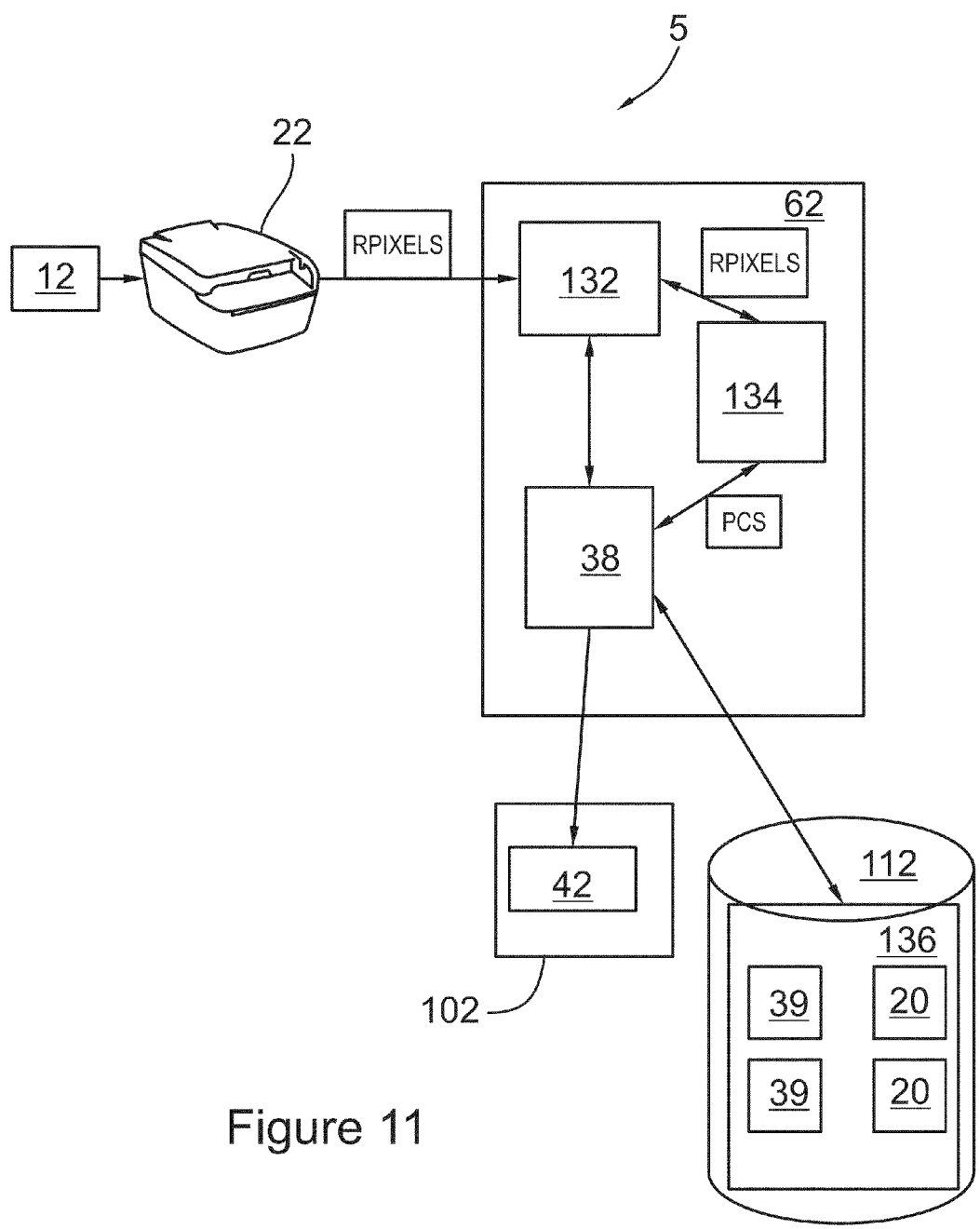
FIG. 11 is a block diagram of a further embodiment of the conversion module of the system of FIG. 5 for operating on the document of FIG. 10.
Figure 13:
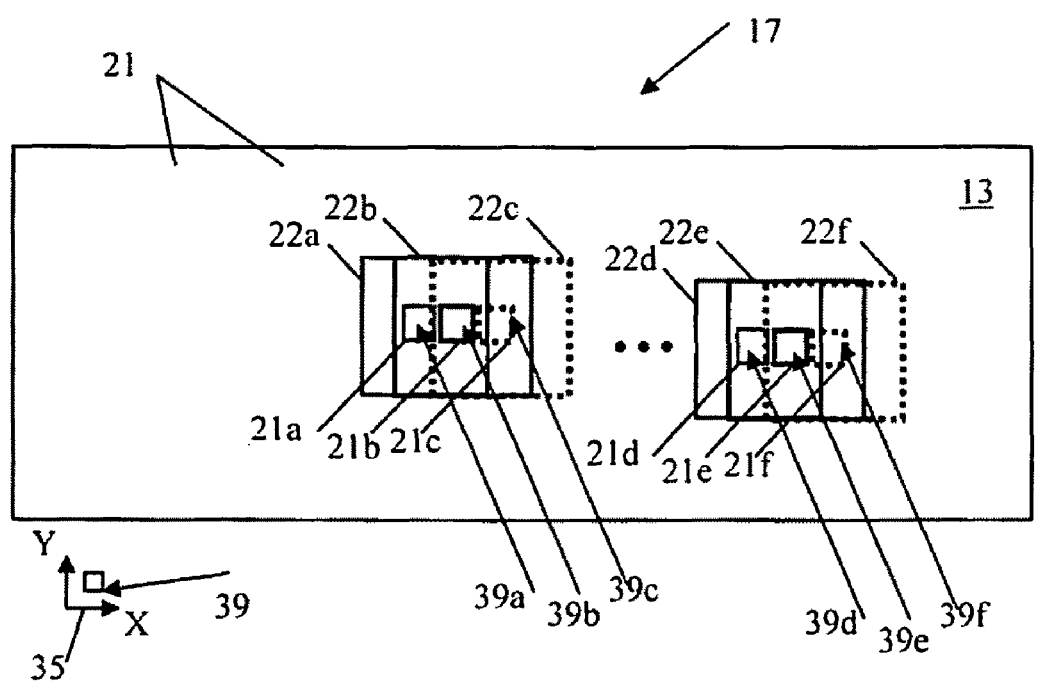
FIG. 13 shows an example determination of PCS values for the document analysis of FIG. 11.
Figure 14:
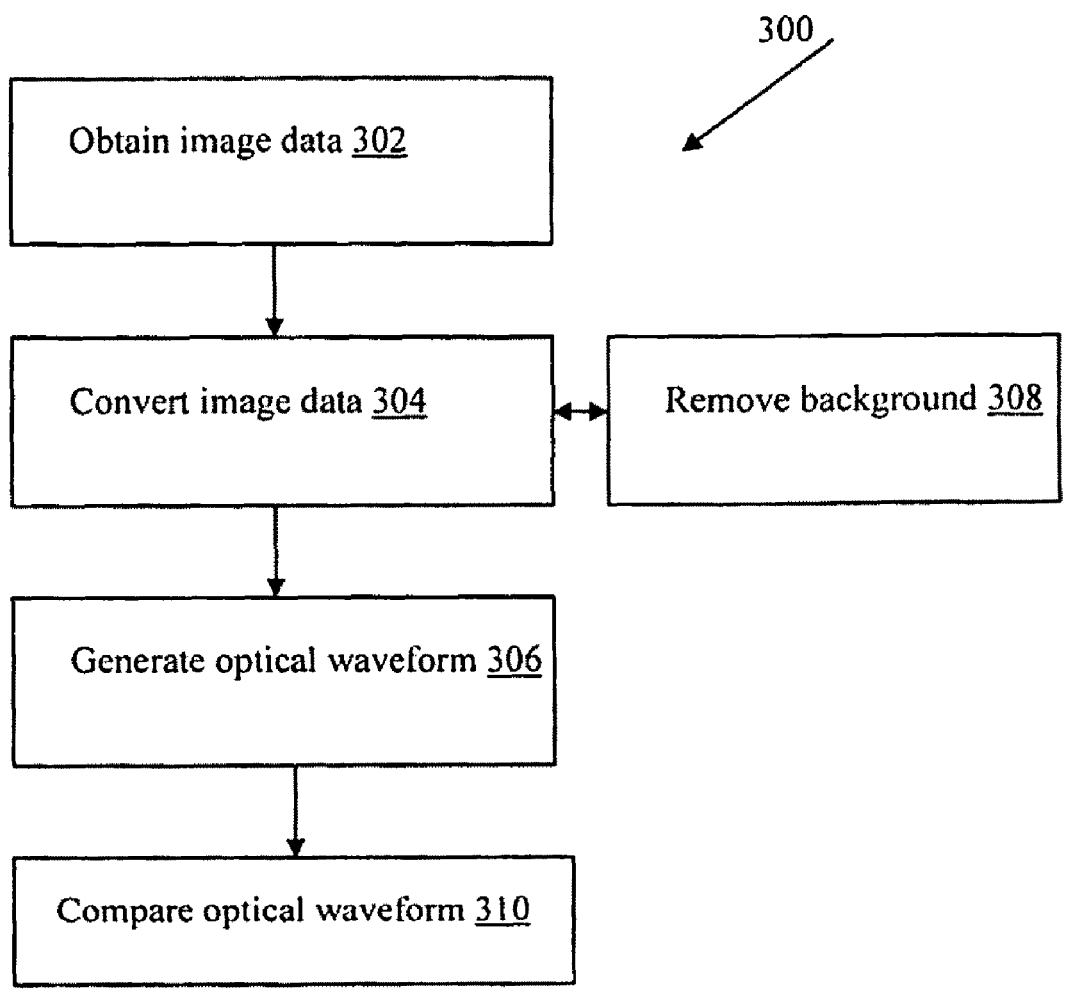
FIG. 14 shows an example operation of the system of FIG. 5.

Referring to FIGS. 10 and 11, shown is an document image testing system 5 for use in testing the AOIs and IMs reflectance against the reflectance of the background images 18 of the document 12 (e.g. check) based on target portions 21 and corresponding defined regions 22 iteratively selected across the surface 13 of the document 12 for all selected locations 39 (see FIG. 13).

It is recognised that the placement/position of the background features 18 on the item surface 13 could overlap the areas of interest AOI that are intended to include the critical data 15 (e.g. either to be placed on the physical item surface 13 by a user of the document 12 and/or during manufacture of the document 12) as well as the IMs. Examples of the critical data 15 and IMs are such as but not limited to: handwritten text/numbers; MICR data; security features; etc.

Referring again to FIG. 11, the design system 5 includes the document 12 for feeding into a scanner 24 configured to record the digital image 17 of the document 12. The scanner 24 illuminates all of the areas (e.g. pixels) of the document 12 by a light source (not shown) and a detector (not shown) measures the intensity distribution of the light reflected by the illuminated areas of the document 12, e.g. on a pixel by pixel basis. The reflectance R for each pixel of the document 12 depends on the amount of absorption and the scattering of the light from the surface 13 of the document 12, as measured by the scanner 24. As such, it is recognised that the digital image 17 has a plurality of reflectance values R assigned to each pixel (or grouping of pixels) dependant upon the resolution of the scanner 24. The reflectance values R are then received by an input module 132 of a PCS engine 62. A calculation module 134 then determines the PCS values for each of the selected target portions 21 using their reflectance value Rt and the reflectance value Rr of the corresponding defined regions 22 (e.g. a ⅛ inch square surrounding the centered target portion 21). The determined PCS values of the digital image 17 are then compared by a comparison module 38 to determine if each of the PCS values satisfies their respective PCS threshold 20 based on the location 39 (see FIG. 13) of the PCS value on the surface 13 of the document image 17. The PCS thresholds 20 are stored in a memory store 112 (e.g. threshold table) as assigned to a respective location 39 in a coordinate system 35 (see FIG. 13) of the digital image 17.

It is recognised that the reflectance value Rr for each of the defined regions 22 of the digital image 17 can be determined as an average (or some other appropriate combination) of the reflectance values of the each of the pixels included in the defined regions 22, as desired. As well, the reflectance value Rt for each of the selected target portions 21 of the digital image 17 can be determined as an average (or some other appropriate combination) of the reflectance values of the each of the pixels included in the target portions 21, as desired. In the most basic case, the reflectance value of a selected pixel is the determined reflectance value Rt of a single pixel target portion 21. For example each defined region 22 can be a specified size (e.g. such as ⅛ inches square) and therefore the reflectance value Rr of each of the defined region 22 of the surface 13 could be the average of the reflectance values for each of the pixels 21 determined in the defined region 22 (e.g. the defined regions represent the possible ⅛" square areas assigned to each of the targeted portions 21—as the ⅛ inch aperture as specified by the ANSI, CPA standards.).

Figure 7C:
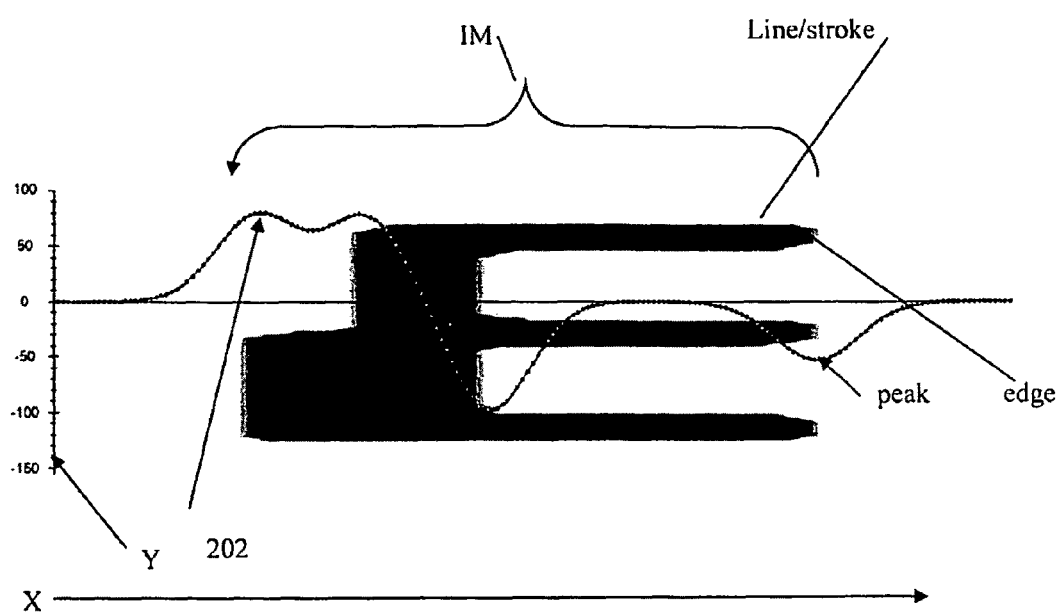

It is recognised that a plurality of the target portions 21 make up the surface 13 of the digital image 17, as shown in FIG. 7 by example for a few target portion 21/defined region 22 combinations 21a-22a, 21b-22b, 21c-22c, 21d-22d, 21e-22e, 21f-22f, etc, located at respective locations 39a, 39b, 39c, 39d, 39e, 39f in the reference frame 35. In other words, the representative (e.g. average) reflectance value Rr of the pixels in the defined region 22a is used with the representative (e.g. single) reflectance value Rt of the pixel in the target portion 21a to calculate the PCS for the target portion 21a as $PCSa=(Rra-Rta)/Rra$, and then the representative (e.g. average) reflectance value, Rr of the pixels in the defined region 22b is used with the representative (e.g. single) reflectance value Rt of the pixel in the target portion 21b to calculate the PCS for the target portion 21b as PCSb=(Rrb−Rtb)/Rrb, and then the representative (e.g. average) reflectance value Rr of the pixels in the defined region 22c is used with the representative (e.g. single) reflectance value Rt of the pixel in the target portion 21c to calculate the PCS for the target portion 21c as PCSc=(Rrc−Rtc)/Rrc, etc., until all of the PCS values for each of the targeted portions 21 of the digital image 17 are calculated across the surface 13 of the image 17 for all desired locations 39 (e.g. all pixels in the AOIs and IMs locations). For example, preferably each of the pixels of the AOIs and the IMs have a PCS value calculated and then compared to the corresponding PCS threshold 20 for that AOI/IM location 39 in the document 12.

It is recognised that the location 39 of each PCS calculation on the surface 13 is recognised so that the PCS value can be compared with the appropriate corresponding PCS threshold 20 for that location 39. In turn, as further described below, each of the calculated PCS values is then compared with the PCS threshold values 20 stored in a PCS threshold table 136, based on location (e.g. X-Y coordinates in an defined X-Y coordinate reference frame 35 of the image 17). These PCS value thresholds 20 are stored in the threshold table 136 that is accessible by the comparison module 134 in the memory 112, such that a threshold 20 is specified for each combination of the location 39 and threshold 20.

Referring again to FIG. 11, the comparison module 38 produces a plurality of compared PCS value results 42, representing those target portion 21 PCS values that satisfied their respective threshold 20. The results 42 can be presented on a user interface 28 (e.g. a display) for subsequent review by the document designer.

Operation of the System 5

Referring to FIGS. 1, 11 and 12, shown is a process 200 for operating the system 5 for use in producing the results 42 of the document 12 that is determined as those target portions 21 that satisfied the PCS threshold(s) 20 for the assigned dynamic defined regions 22 positioned on the surface 13 of the document image 17.

Referring to FIG. 12, step 202 of the design process 200 provides (e.g. via the scanner 24) reflectance values R pixels of the document 12, including the AOIs, background image(s) 18 and IMs. At step 204, the PCS engine 62 determines the PCS values for each target portion 21 of the surface 13 of the image 17. At step 206, the PCS engine 62 looks up the corresponding PCS thresholds 20 from the table 136. At step 208, the PCS engine 62 compares the calculated PCS values with the appropriate PCS threshold(s) 20 to determine those target portions 21 results 42 that either satisfy or do not satisfy the PCS threshold(s) 20. At step 210, the accepted/rejected target portions 21 are shown to the designer via the user interface 28. At step 212, in the event that certain target portions 21 of the results 42 have unsatisfactory PCS values, the design parameters of the background image 18 are revised, including selection of the color(s) characteristics and/or color density of the background images, for example, the new printed document is produced, and steps 202, 204, 206, 208 are repeated. At step 212, if the document design is considered acceptable. (e.g. does not contain a specified number of target portions 21 that have PCS values that do not satisfy the PCS threshold(s) 20), the document 12 design is deemed satisfactory. For example, the degree of target portions 21 that satisfy their PCS threshold value 20 is indicative of the acceptability of the design of the background image 18 when processed by the digital image recorder (e.g. scanner 24).

Example of Embodiment of Systems 5,10

Figure 15:
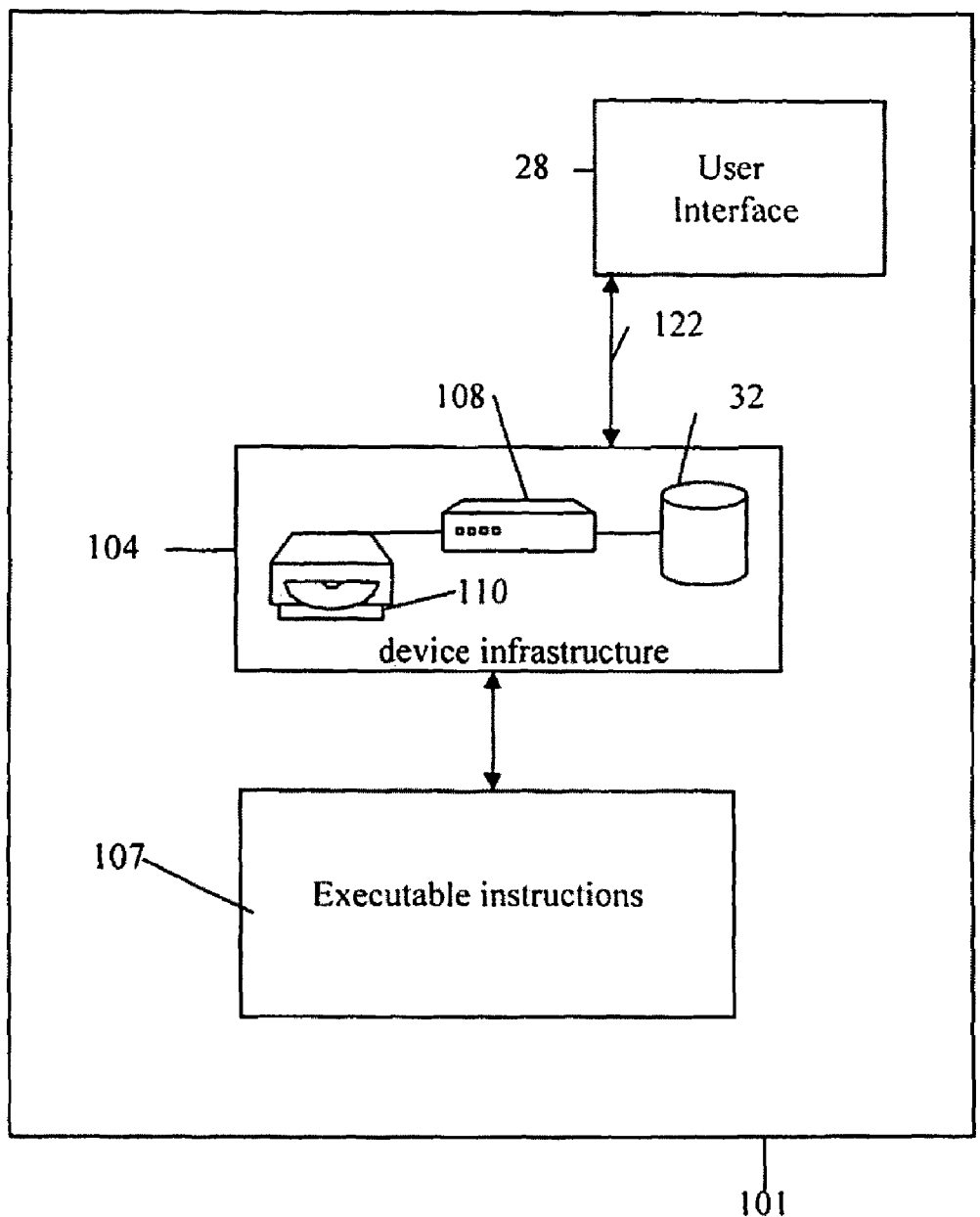
FIG. 15 shows an example embodiment of a computing system for the systems of FIGS. 5 and 11.

Referring to FIG. 15, a computing device 101 of the systems 5,10 can have a user interface 28, coupled to a device infrastructure 104 by connection 122, to interact with a document designer (not shown). The user interface 28 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 15, operation of the device 101 is facilitated by the device infrastructure 104. The device infrastructure 104 includes one or more computer processors 108 and can include an associated memory 32 (e.g. a random access memory). The computer processor 108 facilitates performance of the device 101 configured for the intended task (e.g. of the respective module(s) of the system 5,10 and reader 24) through operation of the user interface 28 and other application programs/hardware 107 of the device 101 by executing task related instructions. These task related instructions can be provided by an operating system, and/or software applications 107 located in the memory 32, and/or by operability that is configured into the electronic/digital circuitry of the processor(s) 108 designed to perform the specific task(s). Further, it is recognized that the device infrastructure 104 can include a computer readable storage medium 110 coupled to the processor 108 for providing instructions to the processor 108 and/or to load/update the instructions 107. The computer readable medium 110 can include hardware and/or software such as, by way of example only, magnetic disks, magnetic tape, optically readable medium such as CD/DVD ROMS, and memory cards. In each case, the computer readable medium 110 may take the form of a small disk, floppy diskette, cassette, hard disk drive, solid-state memory card, or RAM provided in the memory module 32. It should be noted that the above listed example computer readable mediums 110 can be used either alone or in combination.

Further, it is recognized that the computing device 101 can include the executable applications 107 comprising code or machine readable instructions for implementing predetermined functions/operations including those of an operating system and the system 5, 10 modules, for example. The processor 108 as used herein is a configured device and/or set of machine-readable instructions for performing operations as described by example above. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the systems 5,10 (e.g. modules) may be implemented in hardware, software or a combination of both. Accordingly, the use of a processor 108 as a device and/or as a set of machine-readable instructions is hereafter referred to generically as a processor/module for sake of simplicity. Further, it is recognised that the systems 5,10 can include one or more of the computing devices 101 (comprising hardware and/or software) for implementing the modules, as desired. Further, it is recognised that the functionality of the modules 132,134,38, 50, 62,64, the reader 24, and the lookup table 136 can be as described above, can be combined and/or can be further subdivided, as desired. It is also recognised that the reflectance values R of the document 12 can be supplied by the scanner 24 to the input module 132 and/or can be calculated by the input module 132 from appropriate data included in the image 17 provided by the scanner 24 to the input module 132, as desired.

We claim:

1. A method for determining an optical waveform based on a plurality of print features of a selected marking of a document, the method comprising the steps of:
    obtaining optical image data representing the print features of the selected marking;
    correcting at least one of print contrast or reflectance of the print features in the optical image data using respective print contrast thresholds or reflectance thresholds to produce a converted pixel map of the selected marking, the pixel map containing an ordered sequence of values; and
    transforming the print features represented in the converted pixel map to a plurality of corresponding waveform features to produce the optical waveform of the selected marking, the corresponding waveform features including a plurality of spaced apart peaks representing respective optical signal levels of the print features.

2. The method of claim 1, wherein the selected marking is a magnetic ink character recognition (MICR) character and the plurality of print features include a line having a printed width and a printed height.

3. The method of claim 2, wherein the selected marking is a plurality of magnetic ink character recognition (MICR) characters of a MICR line.

4. The method of claim 1, further comprising the step of removing one or more background print features from the optical image data by the correcting step.

5. The method of claim 1, wherein the selected marking includes a combination of distributed lines in at least one of a vertical direction or a horizontal direction, the combination of distributed lines either continuously connected or spaced apart from one another.

6. The method of claim 5, wherein the combination of distributed lines is a MICR character.

7. The method of claim 5, wherein the map is a pixel matrix having one binary value representing the presence of at least a portion of the printed combination of distributed lines in a first pixel and the other binary value representing the absence of any of the printed combination of distributed lines in a second pixel.

8. The method of claim 1, wherein the waveform features further include features selected from the group consisting of: peak spacing between adjacent peaks; peak amplitude; a reference value between peaks representing a lack of the printed features; only positive peaks; only negative peaks; and both positive and negative peaks.

9. The method of claim wherein the peaks represent at least one of a leading edge or a trailing edge of the print features.

10. The method of claim 1, wherein there is a correlation in the optical waveform between relative positioning of the plurality of spaced apart peaks and relative positioning of edges in the print features of the selected marking.

11. The method of claim 1, wherein there is a correlation in the optical waveform between peak amplitude and height of the print features or the selected marking.

12. The method of claim 1 further comprising the step of comparing the produced optical waveform to a template optical waveform based on print features of the selected marking defined in a print standard.

13. The method of claim 12, wherein the template optical waveform is based on at least one of optimum print contrast signal or optimum reflectance.

14. The method of claim 13, wherein there is a correlation in the template optical waveform between relative positioning of template spaced apart peaks and relative positioning of edges in the print features of the selected marking defined in the print standard.

15. The method of claim 13, wherein there is a correlation in the template optical waveform between peak amplitude and height of the print features of the selected marking defined in the print standard.

16. A system for determining an optical waveform based on a plurality of print features of a selected marking of a document, the system comprising:
    an optical reader device to obtain optical image data representing the print features of the selected marking;
    a conversion module to correct at least one of print contrast or reflectance of the print features in the optical image data using respective print contrast thresholds or reflectance thresholds to produce a converted pixel map of the selected marking, the pixel map containing an ordered sequence of values; and
    a generation module to transform the print features represented in the converted pixel map to a plurality of corresponding waveform features to produce the optical waveform of the selected marking, the corresponding waveform features including a plurality of spaced apart peaks representing respective optical signal levels of the print features.

17. The system of claim 16, wherein the selected marking is a magnetic ink character recognition (MICR) character and the plurality of print features include a line having a printed width and a printed height.

18. The system of claim 17, wherein the selected marking is a plurality of magnetic ink character recognition (MICR) characters of a MICR line.

19. The method of claim 16 further comprising an analysis module to compare the produced optical waveform to a template optical waveform based on print features of the selected marking defined in a print standard.

20. An optical reader device configured to generate an optical waveform based on a plurality of print features of a selected marking of a document, the device comprising:
    an optical reader head to obtain optical image data representing the print features of the selected marking;
    a conversion module to correct at least one of print contrast or reflectance of the print features in the optical image data using respective print contrast thresholds or reflectance thresholds to produce a converted pixel map of the selected marking, the pixel map containing an ordered sequence of values; and
    a generation module to transform the print features represented in the converted pixel map to a plurality of corresponding waveform features to produce the optical waveform of the selected marking, the corresponding waveform features including a plurality of spaced apart peaks representing respective optical signal levels of the print features.

* * * * *